(12) United States Patent
Kontkanen

(10) Patent No.: US 10,324,580 B2
(45) Date of Patent: Jun. 18, 2019

(54) CAUSING DISPLAY OF A NOTIFICATION

(71) Applicant: Nokia Technologies Oy, Espoo (FI)

(72) Inventor: Mikael Kontkanen, Ilmarinen (FI)

(73) Assignee: Nokia Technologies Oy, Espoo (FI)

( * ) Notice: Subject to any disclaimer, the term of this patent is extended or adjusted under 35 U.S.C. 154(b) by 467 days.

(21) Appl. No.: 14/909,050

(22) PCT Filed: Aug. 2, 2013

(86) PCT No.: PCT/FI2013/050785
§ 371 (c)(1),
(2) Date: Jan. 29, 2016

(87) PCT Pub. No.: WO2015/015048
PCT Pub. Date: Feb. 5, 2015

(65) Prior Publication Data
US 2016/0170568 A1 Jun. 16, 2016

Related U.S. Application Data

(63) Continuation of application No. PCT/FI2013/050785, filed on Aug. 2, 2013.

(51) Int. Cl.
*G06F 3/147* (2006.01)
*G06F 3/0481* (2013.01)
(Continued)

(52) U.S. Cl.
CPC .......... *G06F 3/0481* (2013.01); *G06F 1/1652* (2013.01); *G06F 1/1677* (2013.01);
(Continued)

(58) Field of Classification Search
CPC . G09G 2380/02; G06F 3/0488; G06F 3/0481; G06F 3/147
See application file for complete search history.

(56) References Cited

U.S. PATENT DOCUMENTS 8,462,106 B2 * 6/2013 Tziortzis ............... G06F 3/01
345/156
9,075,435 B1 * 7/2015 Noble ............... G06F 3/013
(Continued)

FOREIGN PATENT DOCUMENTS

CN 101739171 A 6/2010
CN 102097047 A 6/2011
(Continued)

OTHER PUBLICATIONS

International Search Report and Written Opinion received for corresponding Patent Cooperation Treaty Application No. PCT/FI2013/050785, dated Apr. 4, 2014, 8 pages.
(Continued)

*Primary Examiner* — Dino Kujundzic
(74) *Attorney, Agent, or Firm* — Alston & Bird LLP

(57) ABSTRACT

A method comprising determining that a flexible display, which comprises a flexural display region between a non-flexural display region and an opposite non-flexural display region, is configured in a closed configuration, determining to cause display of a notification, determining a notification display region based, at least in part, on the closed configuration, and causing display of a representations of the notification in the notification display region is disclosed.

20 Claims, 13 Drawing Sheets

(51) Int. Cl.
  *G06F 3/0488* (2013.01)
  *G06F 1/16* (2006.01)
(52) U.S. Cl.
  CPC ............ *G06F 3/0488* (2013.01); *G06F 3/147* (2013.01); *G09G 2354/00* (2013.01); *G09G 2380/02* (2013.01)

(56) References Cited

U.S. PATENT DOCUMENTS

| | | | | |
|---|---|---|---|---|
| 9,933,819 | B2* | 4/2018 | Kim | G06F 1/1652 |
| 2003/0098857 | A1* | 5/2003 | Gettemy | G06F 1/1615 |
| | | | | 345/173 |
| 2006/0274036 | A1* | 12/2006 | Hioki | G06F 3/0412 |
| | | | | 345/156 |
| 2010/0056223 | A1* | 3/2010 | Choi | G06F 1/1601 |
| | | | | 455/566 |
| 2010/0060548 | A1* | 3/2010 | Choi | G06F 3/0414 |
| | | | | 345/1.3 |
| 2010/0117975 | A1 | 5/2010 | Cho | |
| 2011/0134087 | A1* | 6/2011 | Moriwaki | G09G 3/20 |
| | | | | 345/204 |
| 2012/0092363 | A1 | 4/2012 | Kim et al. | |
| 2013/0088410 | A1 | 4/2013 | Hill et al. | |
| 2013/0127918 | A1* | 5/2013 | Kang | G06F 3/0481 |
| | | | | 345/660 |
| 2013/0222236 | A1* | 8/2013 | Gardenfors | G06F 1/1626 |
| | | | | 345/156 |
| 2013/0328914 | A1* | 12/2013 | Smith | G06F 3/01 |
| | | | | 345/619 |
| 2014/0002419 | A1* | 1/2014 | Thorson | G06F 3/147 |
| | | | | 345/175 |
| 2014/0015743 | A1* | 1/2014 | Seo | G06F 1/1694 |
| | | | | 345/156 |
| 2014/0118317 | A1* | 5/2014 | Song | G06F 1/1652 |
| | | | | 345/204 |
| 2014/0176421 | A1* | 6/2014 | Chen | G06F 1/1652 |
| | | | | 345/156 |
| 2014/0210706 | A1* | 7/2014 | Park | G06F 3/0487 |
| | | | | 345/156 |
| 2014/0282059 | A1* | 9/2014 | Oh | G06F 1/1641 |
| | | | | 715/744 |
| 2015/0378557 | A1* | 12/2015 | Jeong | G06F 3/0488 |
| | | | | 715/835 |

FOREIGN PATENT DOCUMENTS

| | | |
|---|---|---|
| EP | 2192750 | 6/2010 |
| EP | 2333756 | 6/2011 |
| JP | 2010-157060 A | 7/2010 |
| JP | 2010211211 | 9/2010 |
| JP | 2011-118245 A | 6/2011 |
| JP | 2011-118303 A | 6/2011 |

OTHER PUBLICATIONS

Office action received for corresponding Japanese Patent Application No. 2016-530560, dated Sep. 29, 2017, 3 pages of office action and no page of translation available.

Office action received for corresponding European Patent Application No. 13752913.7, dated May 30, 2017, 5 pages.

Office action received for corresponding Japanese Patent Application No. 2016-530560, dated Jan. 6, 2017, 4 pages of office action and 4 pages of office action translation available.

Office action received for corresponding Chinese Patent Application No. 201380080036.9, dated Jan. 30, 2018, 9 pages of office action and no page of translation available.

Office Action for Chinese Application No. 201380080036.9 dated Nov. 15, 2018, 9 pages.

Office Action for Chinese Application No. 201380080036.9 dated Mar. 19, 2019, 4 pages.

Office Action for Vietnamese Application No. 1-2016-00658 dated Mar. 28, 2019, 2 pages.

\* cited by examiner

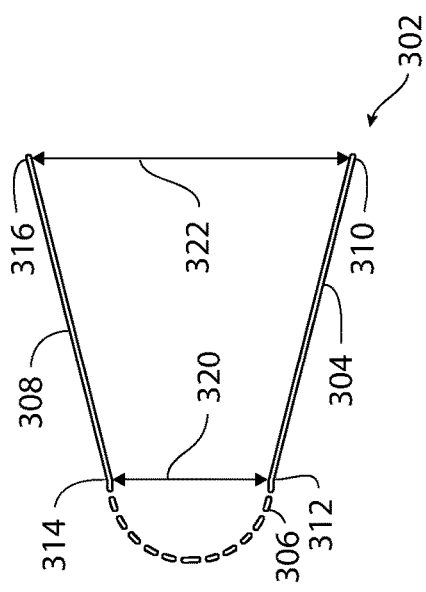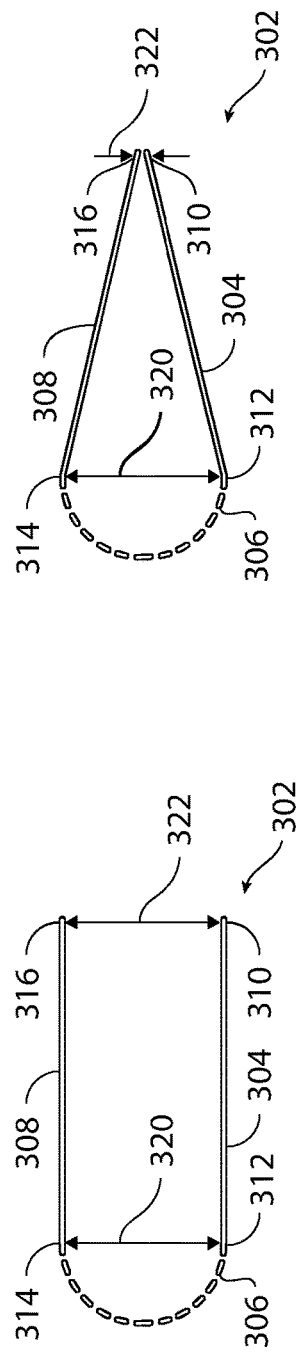

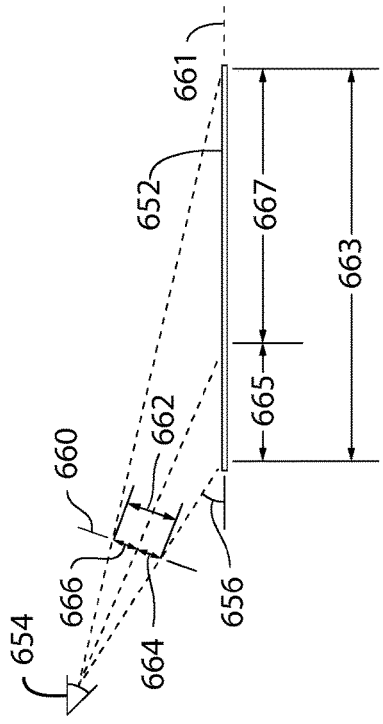
FIG.6A
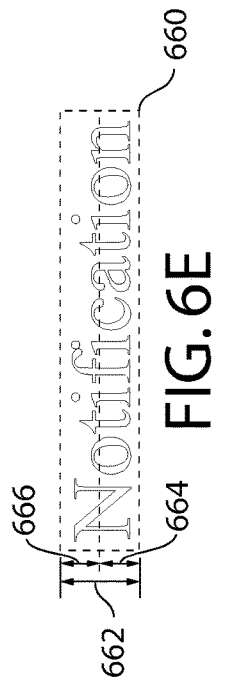
FIG.6B
FIG.6C
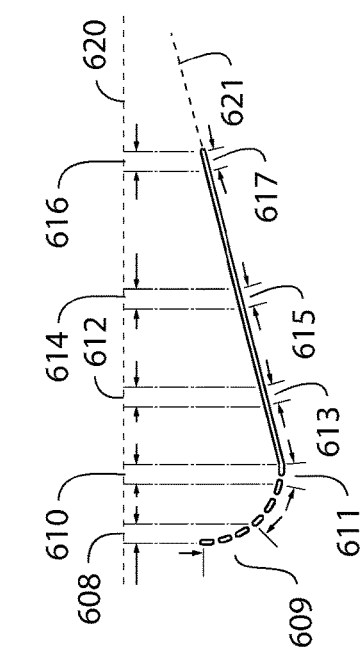
FIG.6D
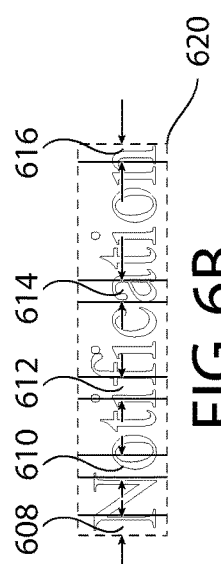
FIG.6E
FIG.6F

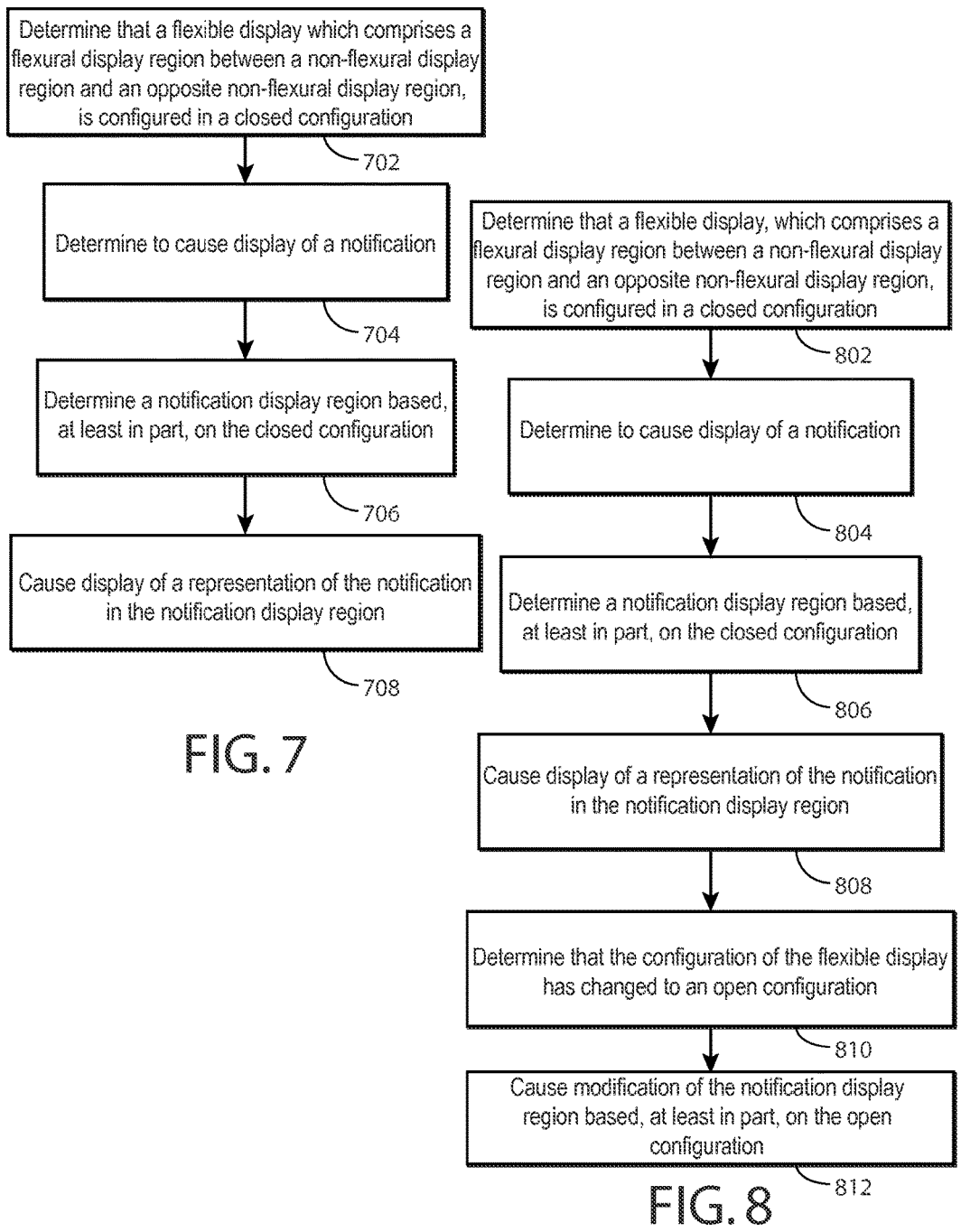

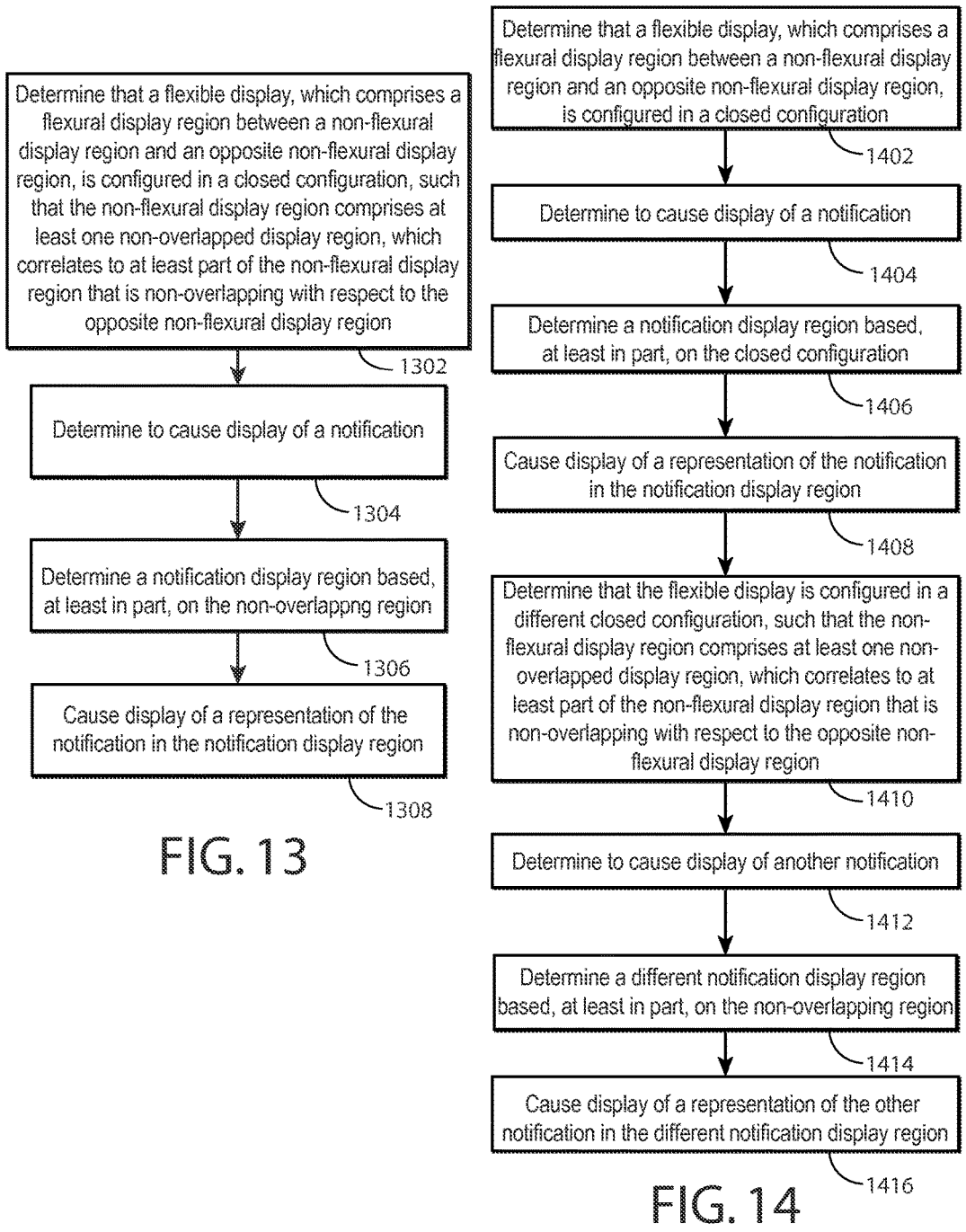

CAUSING DISPLAY OF A NOTIFICATION

RELATED APPLICATION

This application was originally filed as PCT Application No. PCT/FI2013/050785 filed Aug. 2, 2013.

TECHNICAL FIELD

The present application relates generally to causing display of a notification.

BACKGROUND

Many users have become dependent on electronic apparatuses to manage various aspects of their lives. For example, many users keep track of many of their appointments, meetings and other events in a calendar program on their electronic apparatus. In addition, many users utilize electronic apparatuses for communication and messaging. Such electronic apparatuses may, for example, display notifications.

SUMMARY

Various aspects of examples of the invention are set out in the claims.

One or more embodiments may provide an apparatus, a computer readable medium, a non-transitory computer readable medium, a computer program product, and a method for determining that a flexible display, which comprises a flexural display region between a non-flexural display region and an opposite non-flexural display region, is configured in a closed configuration, determining to cause display of a notification, determining a notification display region based, at least in part, on the closed configuration, and causing display of a representations of the notification in the notification display region.

One or more embodiments may provide an apparatus, a computer readable medium, a computer program product, and a non-transitory computer readable medium having means for determining that a flexible display, which comprises a flexural display region between a non-flexural display region and an opposite non-flexural display region, is configured in a closed configuration, means for determining to cause display of a notification, means for determining a notification display region based, at least in part, on the closed configuration, and means for causing display of a representations of the notification in the notification display region.

One or more embodiments may provide an apparatus, a computer readable medium, a non-transitory computer readable medium, a computer program product, and a method for determining that a flexible display, which comprises a flexural display region between a non-flexural display region and an opposite non-flexural display region, is configured in a closed configuration, such that the non-flexural display region comprises at least one non-overlapped display region, which correlates to at least part of the non-flexural display region that is non-overlapping with respect to the opposite non-flexural display region, determining to cause display of a notification, determining a notification display region based, at least in part, on the non-overlapping region, and causing display of a representation of the notification in the notification display region.

One or more embodiments may provide an apparatus, a computer readable medium, a computer program product, and a non-transitory computer readable medium having means for determining that a flexible display, which comprises a flexural display region between a non-flexural display region and an opposite non-flexural display region, is configured in a closed configuration, such that the non-flexural display region comprises at least one non-overlapped display region, which correlates to at least part of the non-flexural display region that is non-overlapping with respect to the opposite non-flexural display region, means for determining to cause display of a notification, means for determining a notification display region based, at least in part, on the non-overlapping region, and means for causing display of a representation of the notification in the notification display region.

In at least one example embodiment, the closed configuration relates to a configuration such that the flexural display region is flexed and a span exists between at least part of the non-flexural display region and at least part of the opposite non-flexural display region.

In at least one example embodiment, the determination that the flexible display is configured in the closed configuration is based, at least in part, on at least one of curvature of the flexural display region, proximity sensor information, or light sensor information.

In at least one example embodiment, the flexible display is configured such that the closed configuration provides for a viewing aperture to a viewable display region.

In at least one example embodiment, the viewable display region at least partially coincides with the notification display region.

In at least one example embodiment, the flexible display is configured such that the non-flexural display region and the opposite non-flexural display region are facing each other.

In at least one example embodiment, the flexible display is configured such that a distance between a flexural boundary and an opposite flexural boundary is greater than or equal to a distance between a non-flexural edge and an opposite non-flexural edge.

In at least one example embodiment, the flexural boundary relates to a boundary between the flexural display region and the non-flexural display region.

In at least one example embodiment, the opposite flexural boundary relates to a boundary between the flexural display region and the opposite non-flexural display region.

In at least one example embodiment, the non-flexural edge relates to an edge of the non-flexural display region opposite of the flexural boundary.

In at least one example embodiment, the opposite non-flexural edge relates to an edge of the opposite non-flexural display region opposite of the opposite flexural boundary.

In at least one example embodiment, the non-flexural edge and opposite non-flexural edge are configured to be capable of flexure.

In at least one example embodiment, the non-flexural edge and opposite non-flexural edge are configured to avoid flexure.

One or more example embodiments further perform determining that the configuration of the flexible display has changed to an open configuration.

In at least one example embodiment, the determination that the configuration of the flexible display has changed to the open configuration is based, at least in part, on at least one of curvature of the flexural display region, proximity sensor information, or light sensor information.

In at least one example embodiment, the open configuration relates to a configuration such that a distance between a flexural boundary and an opposite flexural boundary is less than a distance between a non-flexural edge and an opposite non-flexural edge.

One or more example embodiments further perform causing modification of the notification display region based, at least in part, on the open configuration.

One or more example embodiments further perform causing modification of the notification display region based, at least in part, on the determination that the configuration of the flexible display has changed to an open configuration.

In at least one example embodiment, the representation of the notification is based, at least in part, on a flexible display viewing angle.

In at least one example embodiment, the representation of the notification relates to a viewing angle compensation transformation of the notification.

In at least one example embodiment, the viewing angle compensation transformation of the notification relates to at least one of a curvilinear transformation, a linear transformation, a stretching transformation, a skewing transformation, or a non-linear transformation.

In at least one example embodiment, the viewing angle compensation transformation is based, at least in part, on an orientation of the flexible display.

In at least one example embodiment, the viewing angle compensation transformation is based, at least in part, on a viewer perspective in relation to the flexible display.

In at least one example embodiment, the viewer perspective is based, at least in part, on gaze tracking information, face recognition information, or predetermined viewer perspective information.

One or more example embodiments further perform determination of the flexible display viewing angle.

In at least one example embodiment, the representation of the notification is based, at least in part, on a flexible display curvature.

In at least one example embodiment, the representation of the notification relates to a curvature compensation transformation of the notification.

In at least one example embodiment, the curvature compensation transformation of the notification relates to at least one of a curvilinear transformation, a linear transformation, a stretching transformation, a skewing transformation, or a non-linear transformation.

In at least one example embodiment, the curvature compensation transformation is based, at least in part, on a curvature of the flexural display region.

One or more example embodiments further perform determination of the flexible display curvature.

In at least one example embodiment, the representation of the notification is based, at least in part, on a flexible display viewing angle and a flexible display curvature.

In at least one example embodiment, the notification display region is based, at least in part, on a flexible display viewing angle.

In at least one example embodiment, the notification display region relates to a viewing angle compensation transformation of the notification.

In at least one example embodiment, the notification display region is based, at least in part, on a flexible display curvature.

In at least one example embodiment, the notification display region relates to a curvature compensation transformation of the notification.

In at least one example embodiment, the notification display region is based, at least in part, on a flexible display viewing angle and a flexible display curvature.

In at least one example embodiment, a position of the notification display region is based, at least in part, on a flexible display viewing angle.

In at least one example embodiment, the position of the notification display region relates to a viewing angle compensation transformation of the notification.

In at least one example embodiment, a position of the notification display region is based, at least in part, on a flexible display curvature.

In at least one example embodiment, the position of the notification display region relates to a curvature compensation transformation of the notification.

In at least one example embodiment, a position of the notification display region is based, at least in part, on a flexible display viewing angle and a flexible display curvature.

In at least one example embodiment, a shape of the notification display region is based, at least in part, on a flexible display viewing angle.

In at least one example embodiment, the shape of the notification display region relates to a viewing angle compensation transformation of the notification.

In at least one example embodiment, a shape of the notification display region is based, at least in part, on a flexible display curvature.

In at least one example embodiment, the shape of the notification display region relates to a curvature compensation transformation of the notification.

In at least one example embodiment, a shape of the notification display region is based, at least in part, on a flexible display viewing angle and a flexible display curvature.

In at least one example embodiment, determining to cause display of the notification is based, at least in part, on occurrence of an event associated with the notification.

In at least one example embodiment, the notification is indicative of the event.

One or more example embodiments further perform determining that the flexible display is configured in a different closed configuration, such that the non-flexural display region comprises at least one non-overlapped display region, which correlates to at least part of the non-flexural display region that is non-overlapping with respect to the opposite non-flexural display region, determining to cause display of another notification, determining a different notification display region based, at least in part, on the non-overlapping region, and causing display of a different representation of the other notification in the different notification display region.

In at least one example embodiment, the other notification corresponds to the notification.

In at least one example embodiment, the other notification is different from the notification.

In at least one example embodiment, a non-flexural display region being non-overlapping with respect to the opposite non-flexural display region relates to existence of a portion of the non-flexural display region having a geometric normal that fails to intersect the opposite non-flexural display region.

In at least one example embodiment, the determination that the flexible display is configured in the different closed configuration is based, at least in part, on at least one of curvature of the flexural display region, proximity sensor information, or light sensor information.

BRIEF DESCRIPTION OF THE DRAWINGS

For a more complete understanding of embodiments of the invention, reference is now made to the following descriptions taken in connection with the accompanying drawings in which:

FIGS. 3A-3C are illustrations showing flexible display configuration according to at least one example embodiment;

FIGS. 6A-6F are illustrations showing representation of a notification according to at least one example embodiment;

FIG. 7 is a flow diagram illustrating activities associated with causing display of a notification according to at least one example embodiment;

FIG. 8 is a flow diagram illustrating activities associated with causing display of a notification according to at least one example embodiment;

FIG. 13 is a flow diagram illustrating activities associated with causing display of a notification according to at least one example embodiment; and FIG. 14 is a flow diagram illustrating activities associated with causing display of a notification according to at least one example embodiment.

DETAILED DESCRIPTION OF THE DRAWINGS

Figure 1:
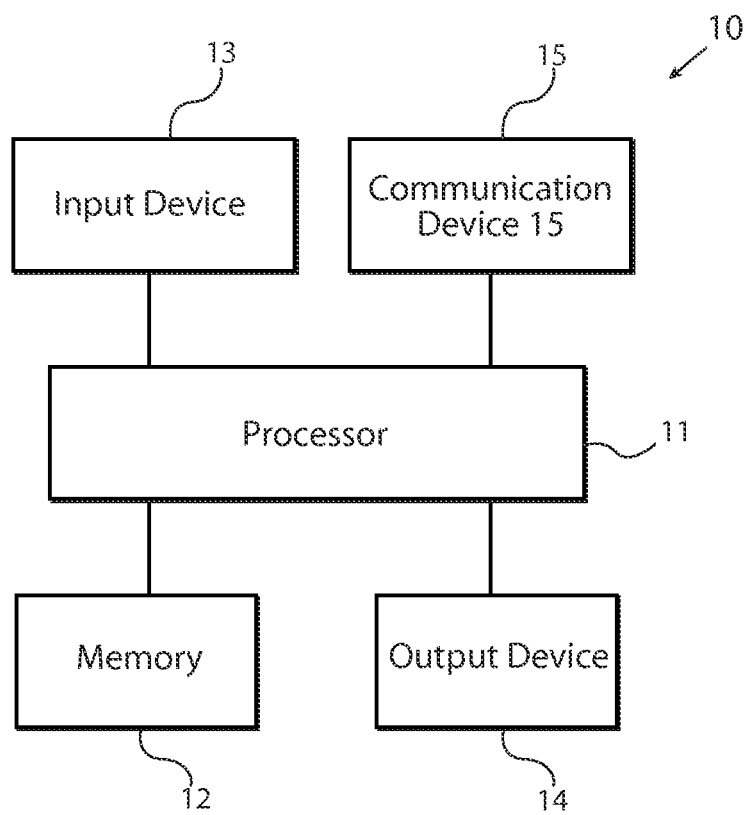
FIG. 1 is a block diagram showing an apparatus according to an example embodiment.

An embodiment of the invention and its potential advantages are understood by referring to FIGS. 1 through 14 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like.

Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may relate to information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
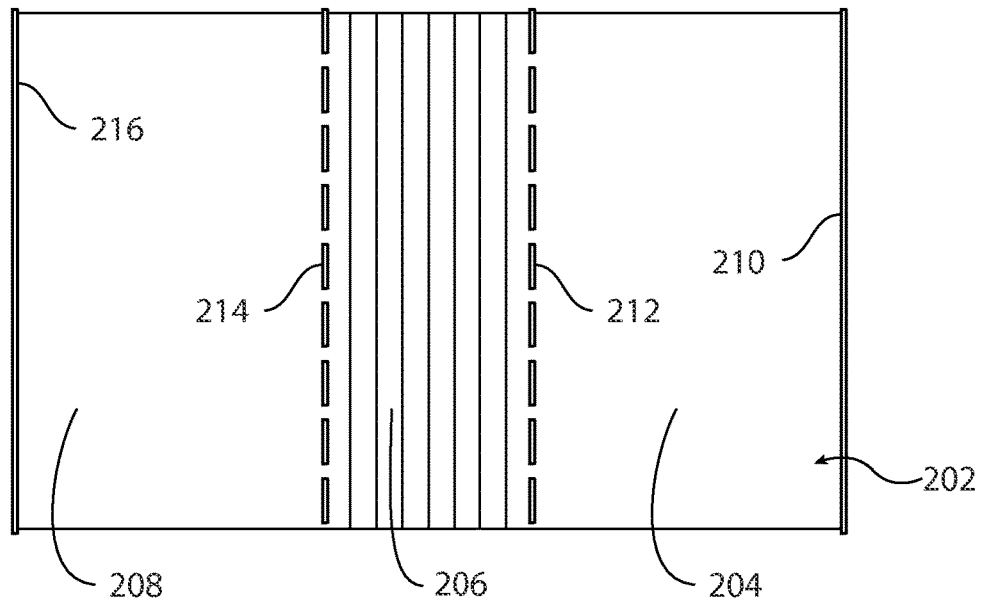
FIGS. 2A-2B are illustrations showing a flexible display according to at least one example embodiment.
Figure 2B:
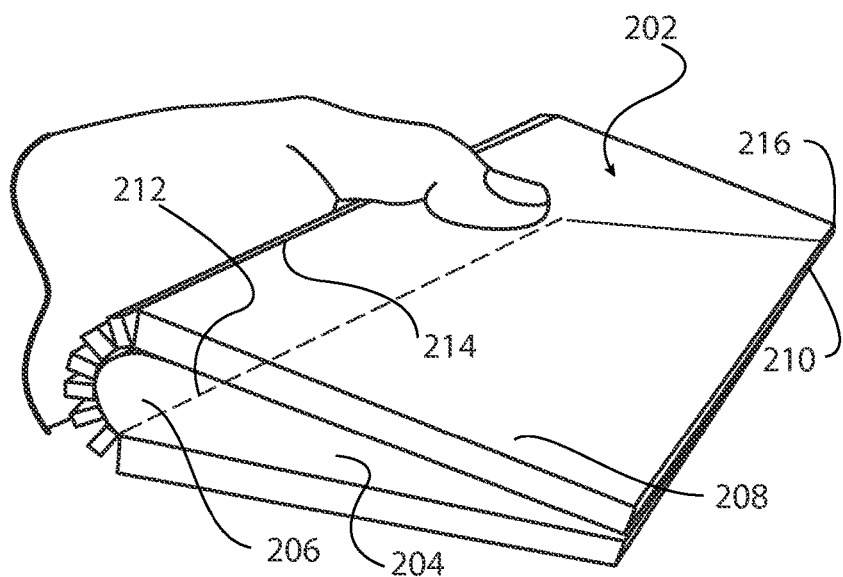

FIGS. 2A-2B are illustrations showing a flexible display according to at least one example embodiment. The examples of FIGS. 2A-2B are merely examples and do not limit the scope of the claims. For example, flexible display dimensions may vary, flexible display design may vary, flexible display curvature may vary, the number of display regions may vary, the size of display regions may vary, and/or the like.

As electronic apparatuses have become more prolific, there has been an increasing desire for electronic apparatuses with large displays. A large display may, for example, increase the usability of the electronic apparatus. As electronic apparatus displays increase in size, the ease of transportations and storage of such an electronic apparatus becomes cumbersome. In certain circumstances, it may be desirable for an electronic apparatus to be flexible, bendable, foldable, and/or the like. In such circumstances, a user may desire the ability to flex, fold, bend, and/or the like the electronic apparatus in order to reduce the physical dimensions of the electronic apparatus, to increase the ease of use of the electronic apparatus, to avoid damage to the flexible display, and/or the like. In at least one example embodiment, an apparatus comprises a flexible display. In such an example, the flexible display may relate to a display that is wholly configured to flex, to a display that comprises at least one flexural display region and at least one non-flexural display region, and/or the like. A flexible display that is wholly configured to flex may, for example, relate to a display that is configured to flex in at least one dimension across the entire display. A flexible display that comprises at least one flexural display region and at least one non-flexural display region may, for example, relate to a display that comprises at least one portion of the display which is configured to flex in at least one dimension and at least one portion of the display which avoids flexure. In such an example, the flexural display region may relate to at least one portion of the display which is configured to flex in at least one dimension and the non-flexural display region may relate to at least one dimension and at least one portion of the display which is configured to avoid flexure.

In certain circumstances, it may be desirable for a user to fold or bend an electronic apparatus substantially in half. In at least one example embodiment, an apparatus comprises a flexible display having a non-flexural display region directly adjacent to a flexural display region directly adjacent to an opposite non-flexural display region. In such an example, the non-flexural display region and the opposite non-flexural display region may be oppositely situated on opposing boundaries between the flexural display region and the non-flexural display regions. In such an example, a boundary between the flexural display region and the non-flexural display region may relate to a flexural boundary. A boundary between the flexural display region and the opposite non-flexural display region may, for example, relate to an opposite flexural boundary. Similarly, an edge of the non-flexural display region opposite of the flexural boundary may, for example, relate to a non-flexural edge. An edge of the opposite non-flexural display region opposite of the flexural boundary may, for example, relate to an opposite non-flexural edge. In this manner, characterization of an edge as a non-flexural edge is utilized to differentiate the edge from the flexural edge. Such characterization does not necessarily indicate that a non-flexural edge is not configured to be flexed, but merely that the edge is opposite and edge that corresponds with a flexural boundary. Therefore, in at least one example embodiment, the non-flexural edge and opposite non-flexural edge are configured to be capable of flexure. For example, in certain configurations, although an edge may be referred to as a non-flexural edge, the non-flexural edge may nonetheless be capable of flexure. In one or more example embodiments, a non-flexural edge and an opposite non-flexural edge are configured to avoid flexure. For example, although the non-flexural edge and the opposite non-flexural edge may be configured to flex, the non-flexural edge and the opposite non-flexural edge may be configured to avoid flexure via non-flexural reinforcements, range of flexural constraints, and/or the like.

FIG. 2A is an illustration showing a flexible display according to at least one example embodiment. The example of FIG. 2A relates to a reconfiguration of the example embodiment illustrated in FIG. 2B. In the example of FIG. 2A, display 202 relates to a flexible display. Display 202 comprises display region 204, display region 206, and display region 208. Display region 204 relates to a non-flexural display region. Display region 206 relates to a flexural display region. Display region 208 relates to an opposite non-flexural display region. In the example of FIG. 2A, boundary 212 relates to a flexural boundary between display region 204 and display region 206. Boundary 214 relates to an opposite flexural boundary between display region 208 and display region 206. In the example of FIG. 2A, edge 210 relates to a non-flexural edge of display region 204, opposite of boundary 212. Edge 216 relates to an opposite non-flexural edge of display region 208, opposite of boundary 214. In the example of FIG. 2A, display 202 may be comprised of one or more display regions in addition to display region 204, display region 206, and display region 208. The absolute size, relative size, position, and/or the like of display region 204, display region 206, and/or display region 208 may differ from the example embodiment illustrated in FIG. 2A.

FIG. 2B is an illustration showing a flexible display according to at least one example embodiment. The example of FIG. 2B relates to a reconfiguration of the example embodiment illustrated in FIG. 2A. For example, the configuration of FIG. 2B may relate to a flexed configuration of display 202. In the example of FIG. 2B, display region 206 is configured in a flexed configuration such that display region 204 and display region 208 are facing each other. In the example of FIG. 2B, display region 206 may be configured to flex inward, flex outward, and/or the like. In the example of FIG. 2B, the distance between edge 210 and edge 216 may vary, the flexure of display region 206 may vary, and/or the like. In the example of FIG. 2B, edge 210 and/or edge 216 may be configured to flex, configured to avoid flexure, and/or the like.

FIGS. 3A-3C are illustrations showing flexible display configuration according to at least one example embodiment. The examples of FIGS. 3A-3C are merely examples and do not limit the scope of the claims. For example, flexible display dimensions may vary, flexible display design may vary, flexible display curvature may vary, the number of display regions may vary, the size of display regions may vary, and/or the like.

In certain situations, it may be desirable to enable the categorization, characterization, and/or the like of the curvature of a flexible display. For example, it may be desirable for an apparatus to be aware of the curvature of a flexural display region of the flexible display. In such an example, a user may desire to associate a specific curvature with a specific configuration of the flexible display. In one or more example embodiments, an apparatus determines the curvature of a flexible display. In such an example, the determination of the curvature of the flexible display may be associated with a flexible display curvature. The flexible display curvature may, for example, be based, at least in part, on a distance between two predetermined points located within a flexural display region and/or a non-flexural display region, the orientation of flexural display region segments, angular disposition of segments of the flexural display region, strain gauges, magnets and/or magnetic sensors, and/or the like.

In at least one example embodiment, a configuration of a flexible display such that a flexural display region of the flexible display is flexed and a span exists between at least part of a non-flexural display region of the flexible display and at least part of an opposite non-flexural display region of the flexible display relates to a closed configuration of the flexible display. In such an example, the span relates to a gap between at least a portion of the non-flexural display region and at least a portion of the opposite non-flexural display region. The span may, for example, create a viewing aperture that allows for viewing of at least a portion of the flexible display. In such an example, the apparatus may determine that the flexible display is configured in a closed configuration. Such a determination that the flexible display is configured in the closed configuration may be based, at least in part, on curvature of the flexural display region, proximity sensor information, light sensor information, and/or the like. Proximity sensor information may relate to magnet sensor information, radar sensor information, and/or the like. In at least one example embodiment, a closed configuration relates to a configuration of a flexible display such that a non-flexural display region and an opposite non-flexural display region are facing each other. In one or more example embodiments, a closed configuration relates to a configuration of a flexible display such that a distance between a flexural boundary and an opposite flexural boundary is greater than or equal to a distance between a non-flexural edge and an opposite non-flexural edge. Similarly, in at least one example embodiment, an open configuration of a flexible display relates to a configuration of the flexible display such that a distance between a flexural boundary and an opposite flexural boundary is less than a distance between a non-flexural edge and an opposite non-flexural edge.

In certain circumstances, it may be desirable for apparatus actions to be based, at least in part, on a current configuration of the apparatus' flexible display. For example, a user may desire certain actions to occur while the apparatus is in a closed configuration and other actions to occur while the apparatus is in an open configuration. In specific circumstances, it may be desirable for apparatus actions to be further based, at least in part, on reconfiguration of a flexible display. For example, a user may desire to tie certain actions to the reconfiguration of the flexible display from an open configuration to a closed configuration. Similarly, for example, a user may desire to tie certain actions to the reconfiguration of the flexible display from a closed configuration to an open configuration. In one or more example embodiments, an apparatus determines that a configuration of a flexible display has changed from a closed configuration to an open configuration. Such a determination that the configuration of the flexible has changed from the closed configuration and to the open configuration may be based, at least in part, on curvature of the flexural display region, proximity sensor information, light sensor information, and/or the like. Proximity sensor information may relate to magnet sensor information, radar sensor information, and/or the like.

FIG. 3A is an illustration showing a flexible display configuration according to at least one example embodiment. The example of FIG. 3A relates to a reconfiguration of the example embodiment illustrated in FIG. 3B and FIG. 3C. In the example of FIG. 3A, display 302 relates to a flexible display in an open configuration. Display 302 comprises display region 304, display region 306, and display region 308. Display region 304 relates to a non-flexural display region. Display region 306 relates to a flexural display region. Display region 308 relates to an opposite non-flexural display region. In the example of FIG. 3A, boundary 312 relates to a flexural boundary between display region 304 and display region 306. Boundary 314 relates to an opposite flexural boundary between display region 308 and display region 306. In the example of FIG. 3A, edge 310 relates to a non-flexural edge of display region 304, opposite of boundary 312. Edge 316 relates to an opposite non-flexural edge of display region 308, opposite of boundary 314.

In the example of FIG. 3A, display 302 is configured such that distance 320 between a boundary 312 and boundary 314 is less than distance 322 between edge 310 and edge 316. In the example of FIG. 3A, distance 322 may be any distance greater than distance 320. In the example of FIG. 3A, display 302 may be comprised of one or more display regions in addition to display region 304, display region 306, and display region 308. The absolute size, relative size, position, and/or the like of display region 304, display region 306, and/or display region 308 may differ from the example embodiment illustrated in FIG. 3A.

FIG. 3B is an illustration showing a flexible display configuration according to at least one example embodiment. The example of FIG. 3B relates to a reconfiguration of the example embodiment illustrated in FIG. 3A and FIG. 3C. In the example of FIG. 3B, display 302 relates to a flexible display in a closed configuration. In the example of FIG. 3B, display 302 is configured such that distance 320 between a boundary 312 and boundary 314 is equal to distance 322 between edge 310 and edge 316. In the example of FIG. 3B, display 302 may be comprised of one or more display regions in addition to display region 304, display region 306, and display region 308. The absolute size, relative size, position, and/or the like of display region 304, display region 306, and/or display region 308 may differ from the example embodiment illustrated in FIG. 3B.

FIG. 3C is an illustration showing a flexible display configuration according to at least one example embodiment. The example of FIG. 3C relates to a reconfiguration of the example embodiment illustrated in FIG. 3A and FIG. 3B. In the example of FIG. 3C, display 302 relates to a flexible display in a closed configuration. In the example of FIG. 3C, display 302 is configured such that distance 320 between a boundary 312 and boundary 314 is greater than distance 322 between edge 310 and edge 316. In the example of FIG. 3C, distance 322 may be any distance in the range between substantially zero and distance 320. In the example of FIG. 3C, display 302 may be comprised of one or more display regions in addition to display region 304, display region 306, and display region 308. The absolute size, relative size, position, and/or the like of display region 304, display region 306, and/or display region 308 may differ from the example embodiment illustrated in FIG. 3C.

Figure 4A:
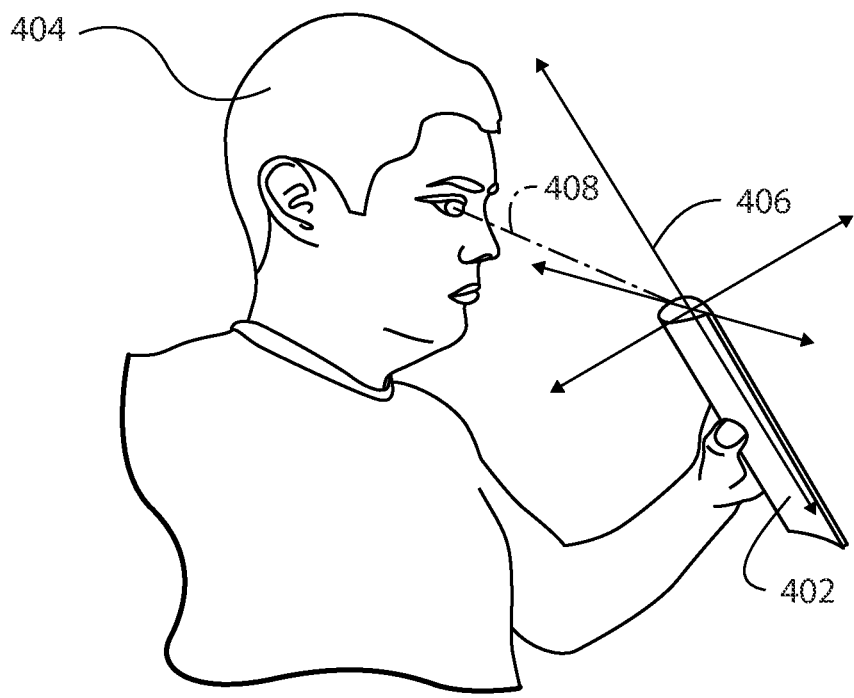
FIGS. 4A-4B are illustrations showing flexible display viewing angle according to at least one example embodiment.
Figure 4B:
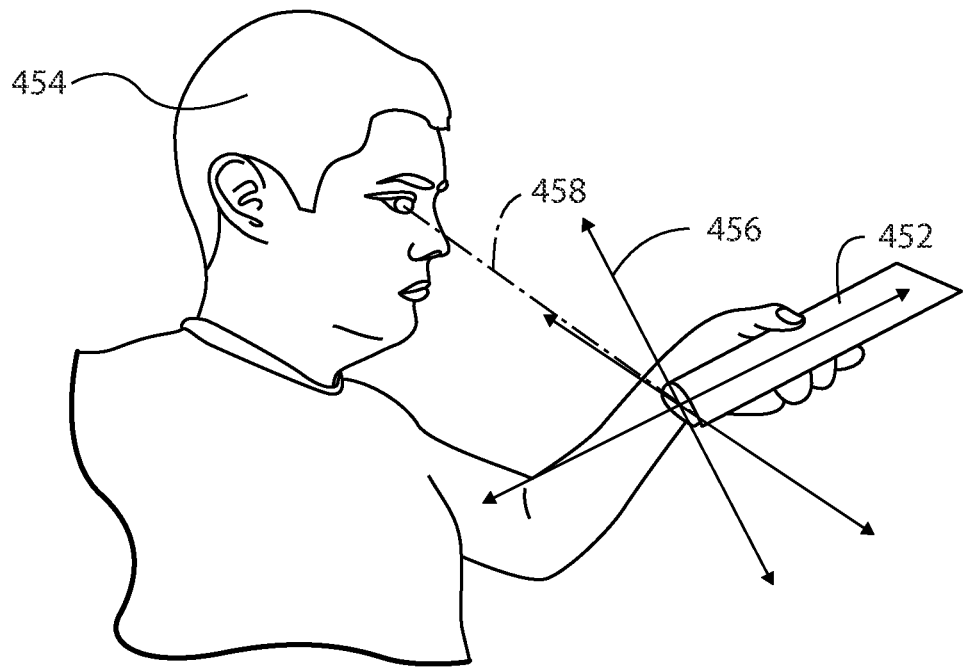

FIGS. 4A-4B are illustrations showing flexible display viewing angle according to at least one example embodiment. The examples of FIGS. 4A-4B are merely examples and do not limit the scope of the claims. For example, apparatus orientation may vary, user perspective may vary, apparatus orientation in relation to viewer perspective may vary, apparatus tilt may vary, apparatus dimensions may vary, and/or the like.

As electronic apparatuses become powerful and capable, it may be desirable to facilitate intelligent and efficient user interactions. For example, a user may desire the ability to effortlessly interact with an electronic apparatus. In such an example, it may be desirable for the electronic apparatus to be aware of its location and/or orientation. Additionally, for example, it may be desirable for an electronic apparatus to be aware of environmental context, such as user position, user perspective, and/or the like.

In certain circumstances, it may be desirable for certain apparatus actions to be based, at least in part, on viewer perspective with respect to a flexible display. Viewer perspective, for example, may be based, at least in part, on gaze tracking information, facial recognition information, flexible display orientation information, or predetermined viewer perspective information. Flexible display orientation information may be associated with accelerometer sensor information, gyroscopic sensor information, and/or the like. For example, flexible display orientation information may relate to information indicating that the flexible display is being held upside down, right side up, backwards, forwards, tilted, and/or the like. Predetermined viewer perspective information may, for example, relate to predetermined flexible display orientation information and/or viewer position information, such as holding the flexible display at a height below the viewer's eyes, holding the flexible display with the flexural display region on the left, orienting the flexible display such that a predetermined flexible display top is positioned at the upper end of the flexible display, flexible display orientation information, and/or the like. In at least one example embodiment, viewer perspective is associated with a flexible display viewing angle. In one or more example embodiments, determination of a flexible display viewing angle may be based, at least in part, on viewer perspective, flexible display orientation information, and/or the like.

FIG. 4A is an illustration showing flexible display viewing angle according to at least one example embodiment. In the example of FIG. 4A, viewer 404 is holding display 402 in a vertical orientation. The vertical orientation of display 402 is associated with axes 406, which relate to a yaw, a pitch, and a roll of display 402. Perspective 408 of viewer 404 intersects with display 402 and forms a flexible display viewing angle with respect to axes 406 of display 402.

FIG. 4B is an illustration showing flexible display viewing angle according to at least one example embodiment. In the example of FIG. 4A, viewer 454 is holding display 452 in a horizontal orientation. The horizontal orientation of display 452 is associated with axes 456, which relate to a yaw, a pitch, and a roll of display 452. Perspective 458 of viewer 454 intersects with display 452 and forms a flexible display viewing angle with respect to axes 456 of display 452.

FIGS. 5A-5D are illustrations showing flexible display configuration according to at least one example embodiment. The examples of FIGS. 5A-5D are merely examples and do not limit the scope of the claims. For example, apparatus dimensions may vary, the number and size of flexural display regions and/or non-flexural display regions may vary, the number and size of notification display regions and/or viewable display regions may vary, and/or the like.

From time to time, miscellaneous events may occur. In some circumstances, a user may find it desirable to be alerted of the occurrence of an event a flexible display. In at least one example embodiment, an event relates to a call, message, notification, update, alarm, calendar occurrence, power, signal strength, location, and/or the like. For example, receipt of an incoming phone call on an apparatus may relate to a call event. Receipt of a social network message, for example, may relate to a message event. In at least one example embodiment, reaching twenty-percent battery capacity may relate to a power event.

In certain circumstances, it may be desirable to associate an event with a notification. For example, a user may be alerted as to an occurrence of an event by way of an associated notification. In at least one example embodiment, an apparatus determines a notification associated with an event. In one or more example embodiments, a notification is indicative of an associated event. A notification may, for example, relate to a notification dialog, a message dialog, a data feed entry, an auditory alert, a visual alert, and/or the like. In at one or more example embodiments, a notification is associated with an event and/or various attributes associated with the event. In one or more example embodiments, a notification may be associated with pushed data, streamed data, pulled data, and/or the like. The notification, for example, may be associated with receipt of data pushed to the apparatus in a publish-subscribe model. In another example, a notification may be associated with receipt of streamed data from a data feed. In such an example, the streamed data may relate to a single data entry of a stream of data entries. In another example, a notification may be associated with receipt of data requested in a pull-based data system. In at least one example embodiment, a notification associated with an event comprises notification content, notification context, and/or the like. For example, a notification may be associated with a message and notification content may relate to a message sender, a message title, a message body, a message header, and/or the like. In one or more example embodiments, the message may relate to a text message, an instant message, a Twitter message, a Facebook message, and/or the like. In at least one example embodiment, a notification may be associated with a call and notification content may relate to a caller, a call source, a call type, and/or the like. In one or more example embodiments, the call type may relate to a voice call, a video call, a packet call, a conference call, a telephonic call, and/or the like. In at least one example embodiment, a notification may be associated with a sensor event and notification content may relate to a sensor reading. For example, a sensor may relate to a temperature sensor, an occupancy sensor, a motion sensor, a light sensor, and/or the like. A sensor event, for example, may relate to temperature conditions meeting some predetermined criteria, occupancy of a room, motion at an entrance door, lighting conditions meeting some predetermined criteria, and/or the like. In at least one example embodiment, a notification context relates to weather condition, date, time of day, temperature, light conditions, environmental condition, location of the peripheral apparatus, and/or the like. For example, notification context may relate to the context surrounding the occurrence of an event. In certain circumstances, more than one event may occur. In such circumstances, it may be desirable to associate each event with a notification. In some circumstances, the two events may be associated with two notifications. For example, two events may be associated with two correlating notifications. Alternatively, two events may be associated with two non-correlating notifications. In one or more example embodiments, an apparatus determines another notification associated with another event in circumstances where the other notification correlates with an event notification.

In certain circumstances, a user may find it desirable to be alerted of the occurrence of an event via a notification. For example, the user may find it desirable to receive the notification by way of the user's apparatus. For example, information indicative of the notification may be displayed. In certain circumstances, it may be desirable to locate the display of notifications to a predetermined portion of a flexible display. In one or more example embodiments, notifications are displayed within a notification display region of a flexible display. The notification display region may be based, at least in part, on a predetermined region of the flexible display, flexible display orientation information, and/or the like. In at least one example embodiment, an apparatus may determine to cause display of a notification. In one or more example embodiments, a determination to cause display of the notification may be based, at least in part, on occurrence of an event associated with the notification. Display of the notification may, for example, relate to display of a representation of the notification, display of information indicative of the notification, and/or the like. In at least one example embodiment, an apparatus may cause display of a representation of a notification in a notification display region. Causing display of a representation of a notification may relate to directly rendering the representation of the notification on a flexible display, indirectly rendering the representation of the notification on the flexible display, directly rendering information indicative of the notification on the flexible display, and/or the like. In at least one example embodiment, an apparatus may cause display of one or more notifications. Such notifications may be caused to be displayed simultaneously, contemporaneously, sequentially, and/or the like. In one or more example embodiments, different notifications may be caused to be displayed in the same notification display region, a different notification display region, a partially overlapping notification display region, and/or the like. For example, a representation of a notification may be displayed in a notification display region while a representation of a different notification may be display in a different notification display region.

In certain circumstances, it may be desirable for the notification display region placement, size, and/or shape to be determined based upon flexible display orientation, flexible display configuration, and/or the like. For example, if a portion of the flexible display is blocked from a viewer's perspective, it may be desirable to avoid positioning the notification display region such that the notification display region is at least partially overlapped or obscured. In at least one example embodiment, a flexible display configured in a closed configuration provides for a viewing aperture to at least a portion of the flexible display. In such an example, it may be desirable to determine a notification display region based, at least in part, on the closed configuration and the viewing aperture. In at least one example embodiment, a portion of the flexible display visible through a viewing aperture from a viewer's perspective relates to a viewable display region. In one or more example embodiments, a viewable display region at least partially coincides with a notification display region. For example, in order to facilitate display of a notification to a viewer, it may be desirable to display the notification on a portion of a flexible display that is viewable from the viewer's perspective. In such an example, it may be desirable to display the notification within a portion of the notification display region that is also within the viewable display region.

In at least one example embodiment, a notification display region is based, at least in part, on a flexible display viewing angle. For example, a flexible display viewing angle associated with a viewer's perspective with respect to a flexible display is associated with obscuration of at least a portion of the flexible display when the flexible display is in a closed configuration. In such an example, a lower flexible display viewing angle may relate to a viewer perspective allowing for a larger viewable display region. Similarly, a higher flexible display viewing angle may relate to a viewer perspective allowing for additional obscuration of the flexible display and an associated smaller viewable display region. In one or more example embodiments, a notification display region is based, at least in part, on a flexible display curvature. For example, a large flexible display curvature of a flexural display region of a flexible display may be associated with a larger obscuration of the flexible display and an associated smaller viewable display region. Alternatively, for example, a small flexible display curvature of a flexural display region of a flexible display may be associated with a smaller obscuration of the flexible display and an associated larger viewable display region. In at least one example embodiment, a notification display region is based, at least in part, on both a flexible display viewing angle and a flexible display curvature.

In at least one example embodiment, a position of a notification display region is based, at least in part, on a flexible display viewing angle. For example, a flexible display viewing angle associated with a viewer's perspective with respect to a flexible display is associated with obscuration of at least a portion of the flexible display when the flexible display is in a closed configuration. In such an example, a lower flexible display viewing angle may relate to a viewer perspective allowing for a larger viewable display region and allowing for less restrictive positioning of a notification display region. Similarly, a higher flexible display viewing angle may relate to a viewer perspective allowing for a smaller viewable display region and allowing for more restrictive positioning of a notification display region. In one or more example embodiments, a position of a notification display region is based, at least in part, on a flexible display curvature. For example, a large flexible display curvature of a flexural display region of a flexible display may be associated with a larger obscuration of the flexible display and an associated smaller viewable display region, resulting in more restrictive positioning of a notification display region. Alternatively, for example, a small flexible display curvature of a flexural display region of a flexible display may be associated with a smaller obscuration of the flexible display and an associated larger viewable display region, resulting in less restrictive positioning of a notification display region. In at least one example embodiment, a position of a notification display region is based, at least in part, on both a flexible display viewing angle and a flexible display curvature.

In at least one example embodiment, a shape of a notification display region is based, at least in part, on a flexible display viewing angle. For example, a flexible display viewing angle associated with a viewer's perspective with respect to a flexible display is associated with obscuration of at least a portion of the flexible display when the flexible display is in a closed configuration. In such an example, a lower flexible display viewing angle may relate to a viewer perspective allowing for a larger viewable display region and allowing for shaping of a notification display region such that it correlates with the larger viewable display region. Similarly, a higher flexible display viewing angle may relate to a viewer perspective allowing for a smaller viewable display region and allowing for shaping of a notification display region such that it correlates with the smaller viewable display region. In one or more example embodiments, a shape of a notification display region is based, at least in part, on a flexible display curvature. For example, a large flexible display curvature of a flexural display region of a flexible display may be associated with a larger obscuration of the flexible display and an associated smaller viewable display region, resulting in shaping of a notification display region such that the notification display region correlates to the smaller viewable display region. Alternatively, for example, a small flexible display curvature of a flexural display region of a flexible display may be associated with a smaller obscuration of the flexible display and an associated larger viewable display region, resulting in shaping of a notification display region such that the notification display region correlates to the larger viewable display region. In at least one example embodiment, a shape of a notification display region is based, at least in part, on both a flexible display viewing angle and a flexible display curvature.

In certain circumstances, a flexible display may be reconfigured from a closed configuration to an open configuration. In such circumstances, a viewable display region of the flexible display may be larger when configured in the open configuration and may be smaller when configured in the closed configuration. Similarly, as less of the flexible display may be obstructed in an open configuration, a position of a notification display region and a size of the notification display region may be modified to account for the change in a viewable display region of the flexible display. In at least one example embodiment, a notification display region is caused to be modified based, at least in part, on a determination that a configuration of a flexible display has changed from a closed configuration and to an open configuration. For example, a notification display region, a position of the notification display region, and/or a shape of the notification display region may be caused to be modified based, at least in part, on the open configuration. For example, a notification may be caused to be displayed within a portion of a notification display region overlapping a small viewable display region of a flexible display in a closed configuration. In such an example, reconfiguration of the flexible display into an open configuration may be associated with a larger viewable display region. The notification display region, position of the notification display region, and shape of the notification display region may be modified based upon the open configuration and larger viewable display region.

Figure 5A:
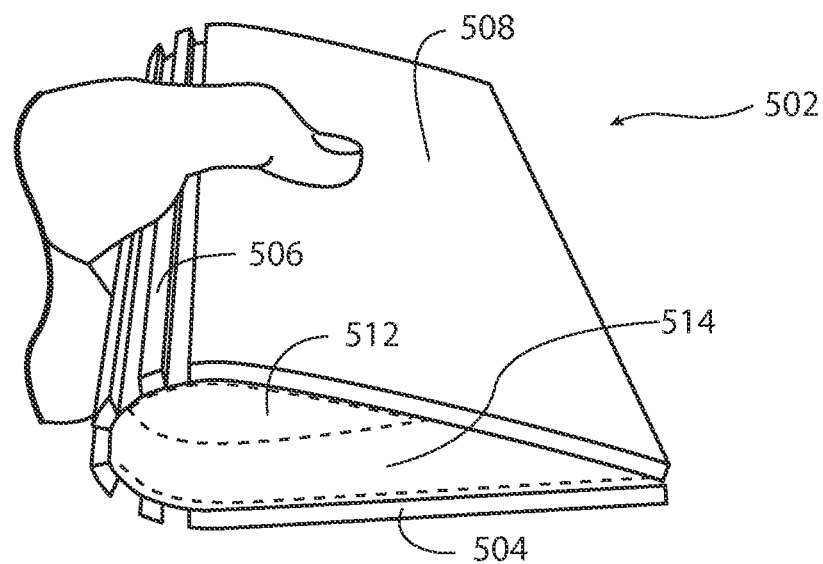
FIGS. 5A-5D are illustrations showing flexible display configuration according to at least one example embodiment.

FIG. 5A is an illustration showing flexible display configuration according to at least one example embodiment. The example of FIG. 5A relates to a reconfiguration of the example embodiment illustrated in FIG. 5B. In the example of FIG. 5A, display 502 relates to a flexible display in a closed configuration and a horizontal orientation. Display 502 comprises display region 504, display region 506, and display region 508. Display region 504 relates to a non-flexural display region. Display region 506 relates to a flexural display region. Display region 508 relates to an opposite non-flexural display region. Display region 504 is associated with display area 512 and display area 514. In the example of FIG. 5A, display area 512 relates to a viewable display region of display region 504. Display area 514 relates to a notification display region of display region 504. In the example of FIG. 5A, display area 512 and display area 514 at least partially overlap one another, wholly overlap one another, and/or the like. Display area 512 and/or display area 514 may be located wholly within display region 506, wholly within display region 504, within multiple display regions, and/or the like. In the example of FIG. 5A, viewable display region 512 may appear as a teardrop shaped region from a viewer's perspective.

Figure 5B:
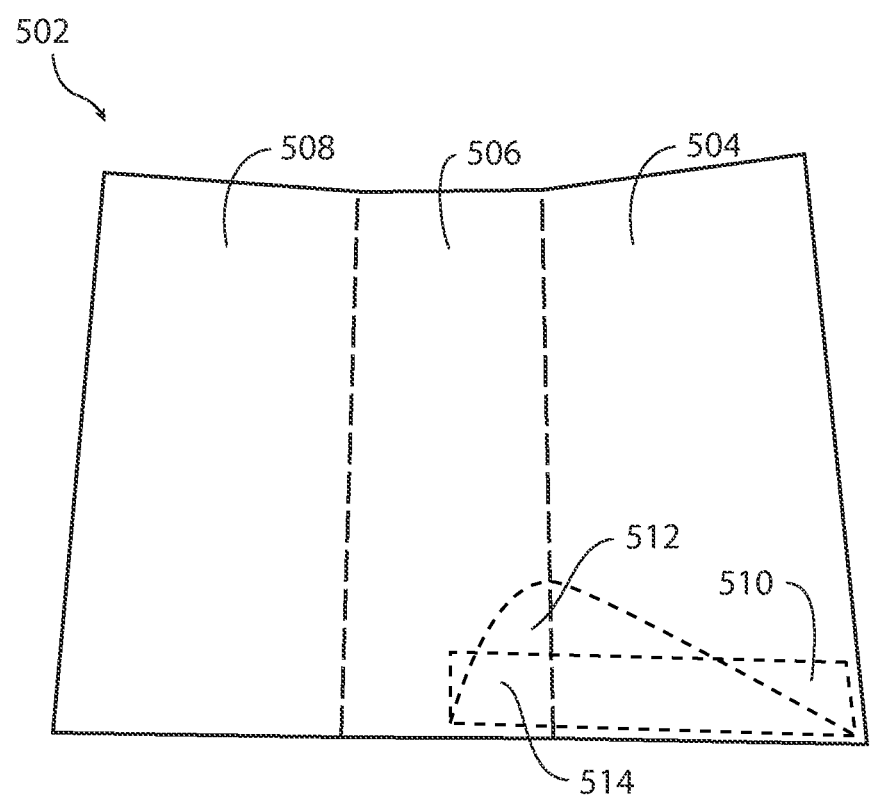

FIG. 5B is an illustration showing flexible display configuration according to at least one example embodiment. The example of FIG. 5B relates to a reconfiguration of the example embodiment illustrated in FIG. 5B. In the example of FIG. 5B, display 502 relates to a flexible display in an open configuration. Display 502 comprises display region 504, display region 506, and display region 508. Display region 504 relates to a non-flexural display region. Display region 506 relates to a flexural display region. Display region 508 relates to an opposite non-flexural display region. Display region 504 is associated with display area 512 and display area 514. In the example of FIG. 5B, display area 512 relates to a viewable display region of display region 504. Display area 514 relates to a notification display region of display region 504. In the example of FIG. 5B, display area 512 and display area 514 at least partially overlap one another, wholly overlap one another, and/or the like. Display area 512 and/or display area 514 may be located wholly within display region 506, wholly within display region 504, within multiple display regions, and/or the like. In the example of FIG. 5B, display area 510 relates to a portion of display area 514 non-overlapping display area 512. For example, display area 510 may relate to a portion of a notification display area that is not within a viewable display region and is thus not viewable from a viewer's perspective. In the example of FIG. 5B, based upon an open configuration of display 502, viewable display region 512 may no longer appear as a teardrop shaped region from a viewer's perspective, but as an arched triangular shaped region.

Figure 5C:
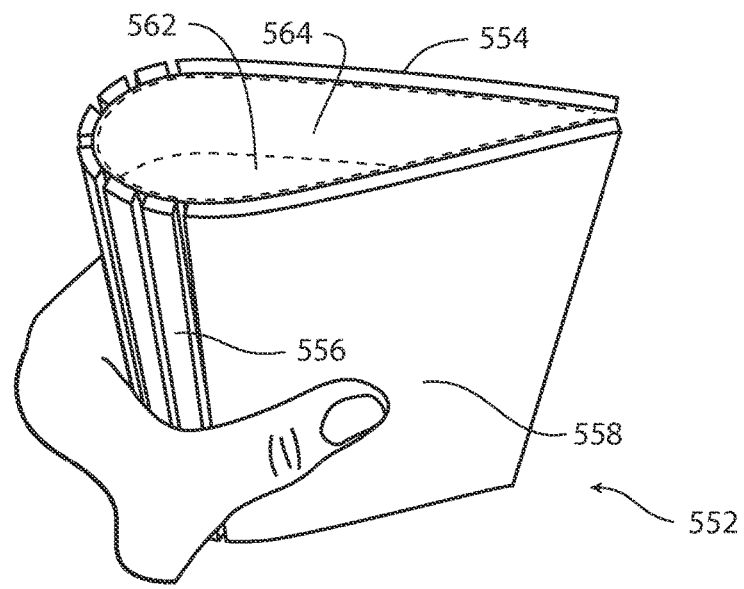

FIG. 5C is an illustration showing flexible display configuration according to at least one example embodiment. The example of FIG. 5C relates to a reconfiguration of the example embodiment illustrated in FIG. 5D. In the example of FIG. 5C, display 552 relates to a flexible display in a closed configuration and a vertical orientation. Display 552 comprises display region 554, display region 556, and display region 558. Display region 554 relates to a non-flexural display region. Display region 556 relates to a flexural display region. Display region 558 relates to an opposite non-flexural display region. Display region 554 is associated with display area 562 and display area 564. In the example of FIG. 5C, display area 562 relates to a viewable display region of display region 554. Display area 564 relates to a notification display region of display region 554. In the example of FIG. 5C, display area 562 and display area 564 at least partially overlap one another, wholly overlap one another, and/or the like. Display area 562 and/or display area 564 may be located wholly within display region 556, wholly within display region 554, within multiple display regions, and/or the like. In the example of FIG. 5C, viewable display region 562 may appear as a teardrop shaped region from a viewer's perspective.

Figure 5D:
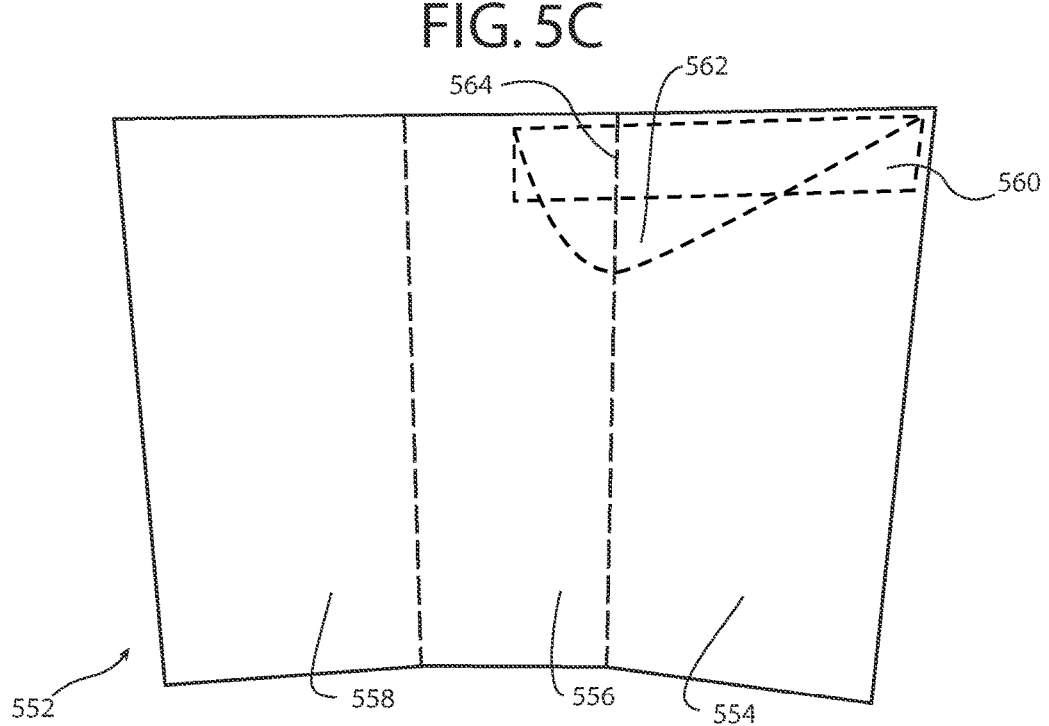

FIG. 5D is an illustration showing flexible display configuration according to at least one example embodiment. The example of FIG. 5D relates to a reconfiguration of the example embodiment illustrated in FIG. 5C. In the example of FIG. 5D, display 552 relates to a flexible display in an open configuration. Display 552 comprises display region 554, display region 556, and display region 558. Display region 554 relates to a non-flexural display region. Display region 556 relates to a flexural display region. Display region 558 relates to an opposite non-flexural display region. Display region 554 is associated with display area 562 and display area 564. In the example of FIG. 5D, display area 562 relates to a viewable display region of display region 554. Display area 564 relates to a notification display region of display region 554. In the example of FIG. 5D, display area 562 and display area 564 at least partially overlap one another, wholly overlap one another, and/or the like. Display area 562 and/or display area 564 may be located wholly within display region 556, wholly within display region 554, within multiple display regions, and/or the like. In the example of FIG. 5D, display area 560 relates to a portion of display area 564 non-overlapping display area 562. For example, display area 560 may relate to a portion of a notification display area that is not within a viewable display region and is thus not viewable from a viewer's perspective. In the example of FIG. 5D, based upon an open configuration of display 552, viewable display region 562 may no longer appear as a teardrop shaped region from a viewer's perspective, but as an arched triangular shaped region.

FIGS. 6A-6F are illustrations showing representation of a notification according to at least one example embodiment. The examples of FIGS. 6A-6F are merely examples and do not limit the scope of the claims. For example, viewing angle compensation transformations may vary, curvature compensation transformations may vary, representation of a notification may vary, and/or the like.

In certain circumstances, it may be desirable to display a notification on a portion of a flexible display that is not at an optimal viewing angle with respect to a viewer's perspective and/or on a portion of the flexible display that is not flat. For example, a viewable display region visible to a viewer looking into a viewing aperture of the flexible display may include a portion of a flexural display region, a portion of a non-flexural display region, and/or the like. In such an example, a notification caused to be displayed within the viewable display region of a notification display region may be illegible from the viewer's perspective due to planar distortion and/or curvature distortion of the notification. In such circumstances, it may be desirable to cause display of a representation of the notification that accounts for such planar distortion and/or curvature distortion. For example, the representation of the notification may relate to a stretched, skewed, warped, twisted, curved, and/or otherwise distorted representation of the notification that, when viewed from a specific viewer's perspective, projects a plain text projection of the notification. In one or more example embodiments, the representation of the notification is based, at least in part, on a flexible display viewing angle. In such an example embodiment, the representation of the notification may relate to a viewing angle compensation transformation of the notification. The viewing angle compensation transformation of the notification may relate to a curvilinear transformation, a linear transformation, a stretching transformation, a skewing transformation, a non-linear transformation, and/or the like. In at least one example embodiment, a viewing angle compensation transformation is determined based, at least in part, on a projection plane of a representation of a notification with respect to a viewer's perspective. For example, the viewing angle compensation transformation may be determined such that, after transformation, the representation of the notification represents the notification on the projection plane rather than on a display plane of a flexible display. In one or more example embodiments, the viewing angle compensation transformation may be based, at least in part, on an orientation of the flexible display. For example, a horizontal orientation of the flexible display may be associated with predetermined flexible display viewing angle information, predetermined viewing angle compensation transformation information, and/or the like. Similarly, for example, a vertical orientation of the flexible display may be associated with different predetermined flexible display viewing angle information, different predetermined viewing angle compensation transformation information, and/or the like. Such information may relate to information associated with viewer perspective, information associated with a flexible display located above or below a viewer's perspective, and/or the like. In at least one example embodiment, the viewing angle compensation transformation may be based, at least in part, on a viewer perspective in relation to the flexible display. For example, a vertical orientation of a flexible display may be associated with predetermined information indicating that the viewer's perspective relates to a top-down perspective rather than a bottom-up perspective.

In certain circumstances, the apparatus may cause a representation of a notification to be displayed at least partially on a flexural display region of a flexible display. In such circumstances, it may be desirable to cause display of a representation of the notification that accounts for such curvature distortion. For example, the representation of the notification may relate to a stretched, skewed, warped, twisted, curved, and/or otherwise distorted representation of the notification that, when viewed from a specific viewer's perspective, accounts for the curvature distortion of the representation of the notification and projects a plain projection of the notification. In at least one example embodiment, the representation of the notification may be based, at least in part, on flexible display curvature. In such an example embodiment, the representation of the notification may relate to a curvature compensation transformation of the notification. In one or more example embodiments, a curvature compensation transformation may be based, at least in part, on a curvature of the flexural display region. For example, a lesser curvature of the flexural display region may be associated with a lesser curvature compensation transformation. Similarly, for example, a greater curvature of the flexural display region may be associated with a greater curvature compensation transformation. The curvature compensation transformation of the notification may relate to a curvilinear transformation, a linear transformation, a stretching transformation, a skewing transformation, a non-linear transformation, and/or the like. In at least one example embodiment, a curvature compensation transformation is determined based, at least in part, on a projection plane of a representation of a notification with respect to a viewer's perspective. For example, the curvature compensation transformation may be determined such that, after transformation, the representation of the notification represents the notification on the projection plane rather than on a display plane of a flexible display. In at least one example embodiment, the representation of the notification may be based, at least in part, on a flexible display viewing angle, a flexible display curvature, a flexible display orientation, and/or the like.

In certain circumstances, it may be desirable to associate a notification display region, size of the notification display region, position of the notification display region, and/or shape of the notification display region with a representation of a notification. For example, the representation of the notification may relate to a stretched viewing angle compensation transformation of the notification. It may be desirable to modify a notification display region based, at least in part, on a representation of a notification to be displayed within the notification display region. In at least one example embodiment, a notification display region may relate to a viewing angle compensation transformation of a notification. Similarly, in one or more example embodiments, a notification display region relates to a curvature compensation transformation of a notification. In at least one example embodiment, a position of a notification display region relates to a viewing angle compensation transformation of a notification, a curvature compensation transformation of a notification, and/or the like. For example, the position of the notification display region may be based, at least in part, on a flexible display viewing angle, a flexible display curvature, and/or the like. Similarly, a shape of a notification display region relates to a viewing angle compensation transformation of a notification, a curvature compensation transformation of a notification, and/or the like. For example, the shape of the notification display region may be based, at least in part, on a flexible display viewing angle, flexible display curvature, and/or the like. A lower flexible display viewing angle may be associated with a larger notification display region having a highly arched upper boundary. A higher flexible display viewing angle may be associated with a smaller notification display region having a lesser arched upper boundary. Notification display region, position of a notification display region, and shape of a notification display region may be similar as described regarding FIGS. 5A-5D.

FIG. 6A is an illustration showing representation of a notification according to at least one example embodiment. In the example of FIG. 6A, display region 604 relates to a non-flexural display region. Display region 606 relates to a flexural display region in a flexed configuration. Segment 608, segment 610, segment 612, segment 614, and segment 616 relate to equal length segments of projection plane 620. Segment 609, segment 611, segment 613, segment 615, and segment 617 relate to various length segments of display plane 621. In the example of FIG. 6A, projection plane segment 608 is represented by display plane segment 609, projection plane segment 610 is represented by display plane segment 611, projection plane segment 612 is represented by display plane segment 613, projection plane segment 614 is represented by display plane segment 615, and projection plane segment 616 is represented by display plane segment 617. In the example of FIG. 6A, the various projection plane segments and the associated representative display plane segments relate to a curvature compensation transformation of a notification. A representation of a notification is displayed on display plane 621 such that a curvature corrected projection of the representation of the notification is projected to a viewer on projection plane 620.

FIG. 6B is an illustration showing representation of a notification according to at least one example embodiment. The example of FIG. 6B relates to projection plane 620, similar as described regarding FIG. 6A. In the example of FIG. 6B, each of segment 608, segment 610, segment 612, segment 614, and segment 616 relate to a portion of a projection of a representation of a notification. In the example of FIG. 6B, segment size may vary, segment count may vary, projection plane dimensions and/or proportions may vary, and/or the like.

FIG. 6C is an illustration showing representation of a notification according to at least one example embodiment. The example of FIG. 6C relates to display plane 621, similar as described regarding FIG. 6A, and is associated with projection plane 620 of FIG. 6B. In the example of FIG. 6C, each of segment 609, segment 611, segment 613, segment 615, and segment 617 relate to a portion of a notification display region of a flexible display containing a displayed representation of a notification and are associated with each of segment 608, segment 610, segment 612, segment 614, and segment 616 of FIGS. 6A and 6B, respectively. In the example of FIG. 6C, a curvature compensation transformation has been applied to segment 609, resulting in a skewed and/or stretched representation of a notification. When projected with respect to a viewer perspective, segment 609 of display plane 621 correlates with segment 608 of projection plane 620. In the example of FIG. 6C, segment size may vary, segment count may vary, display plane dimensions and/or proportions may vary, and/or the like. In the example of FIG. 6C, although only five discrete segments have been identified, a curvature compensation transformation may apply in a continuous and/or linear fashion.

FIG. 6D is an illustration showing representation of a notification according to at least one example embodiment. In the example of FIG. 6D, display 652 relates to at least a portion of a flexible display. Perspective 654 relates to a viewer perspective with respect to display 652. Perspective 654 is associated with angle 656. Angle 656 relates to a flexible display viewing angle in relation to display 652 and display plane 661 and may be associated with any portion of perspective 654 intersecting with display plane 661. Projection plane 660 relates to a plane onto which a representation of a notification displayed on display 652 is projected. Projection plane 660 is associated with viewer perspective 654. In the example of FIG. 6D, distance 662 relates to a total height of a viewer's perspective at projection plane 660. Distance 663 relates to a total height of a viewable display region of a notification display region of display 652. In the example of FIG. 6D, distance 662 relates to distance 663 such that a representation of a notification displayed on display 652 accurate projects the notification on projection plane 620. A representation of a notification is displayed on display plane 661 such that a viewing angle corrected projection of the representation of the notification is projected to a viewer on projection plane 660. In the example of FIG. 6D, distance 664 and distance 666 relate to equal length portions of distance 662. Distance 665 and distance 667 relate to unequal length portions of distance 663. Distance 664 relates to distance 665 such that a portion of a representation of a notification displayed within distance 665 corresponds to a projection of distance 664. Similarly, distance 666 relates to distance 667 such that a portion of a representation of a notification displayed within distance 667 corresponds to a projection of distance 666.

FIG. 6E is an illustration showing representation of a notification according to at least one example embodiment. The example of FIG. 6E relates to projection plane 660, similar as described regarding FIG. 6D. In the example of FIG. 6E, distance 664 and distance 666 each relate to one half of distance 662. Distance 662 relates to a height of a projection of a representation of a notification, a height of a viewing aperture with respect to a viewer's perspective, and/or the like. In the example of FIG. 6E, a representation of a notification is projected onto projection plane 660 such that a notification may be legible and/or corrected for viewing angle distortion from a viewer's perspective.

FIG. 6F is an illustration showing representation of a notification according to at least one example embodiment. The example of FIG. 6F relates to display plane 661, similar as described regarding FIG. 6D. In the example of FIG. 6F, distance 663 relates to a height of a notification display region, a height of a viewable display region, a height of a representation of a notification, and/or the like. Distance 663 comprises distance 665 and distance 667. Distance 665 relates to distance 664 of FIG. 6E and distance 667 relates to distance 666 of FIG. 6E. In the example of FIG. 6F, a viewing angle compensation transformation has been applied, resulting in a skewed and/or stretched representation of a notification. When projected with respect to a viewer perspective, distance 665 of display plane 661 correlates with distance 664 of projection plane 660. Similarly, when projected with respect to a viewer perspective, distance 667 of display plane 661 correlates with distance 666 of projection plane 660. In the example of FIG. 6F, distance may vary, distance count may vary, display plane dimensions and/or proportions may vary, and/or the like. In the example of FIG. 6F, although only two discrete distances have been identified, a viewing angle compensation transformation may apply in a continuous and/or linear fashion.

FIG. 7 is a flow diagram illustrating activities associated with causing display of a notification according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

At block 702, the apparatus determines that a flexible display, which comprises a flexural display region between a non-flexural display region and an opposite non-flexural display region, is configured in a closed configuration, similar as described regarding FIGS. 2A-2B and FIG. 3A-3C.

At block 704, the apparatus determines to cause display of a notification, similar as described regarding FIGS. 5A-5D.

At block 706, the apparatus determines a notification display region based, at least in part, on the closed configuration, similar as described regarding FIGS. 5A-5D.

At block 708, the apparatus causes display of a representation of the notification in the notification display region, similar as described regarding FIGS. 5A-5D and FIGS. 6A-6F.

FIG. 8 is a flow diagram illustrating activities associated with causing display of a notification according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus determines that a flexible display, which comprises a flexural display region between a non-flexural display region and an opposite non-flexural display region, is configured in a closed configuration, similar as described regarding block 702 of FIG. 7.

At block 804, the apparatus determines to cause display of a notification, similar as described regarding block 704 of FIG. 7.

At block 806, the apparatus determines a notification display region based, at least in part, on the closed configuration, similar as described regarding block 706 of FIG. 7.

At block 808, the apparatus causes display of a representation of the notification in the notification display region, similar as described regarding block 708 of FIG. 7.

At block 810, the apparatus determines that the configuration of the flexible display has changed to an open configuration, similar as described regarding FIGS. 3A-3C.

At block 812, the apparatus causes modification of the notification display region based, at least in part, on the open configuration, similar as described regarding FIGS. 5A-5D.

Figure 9:
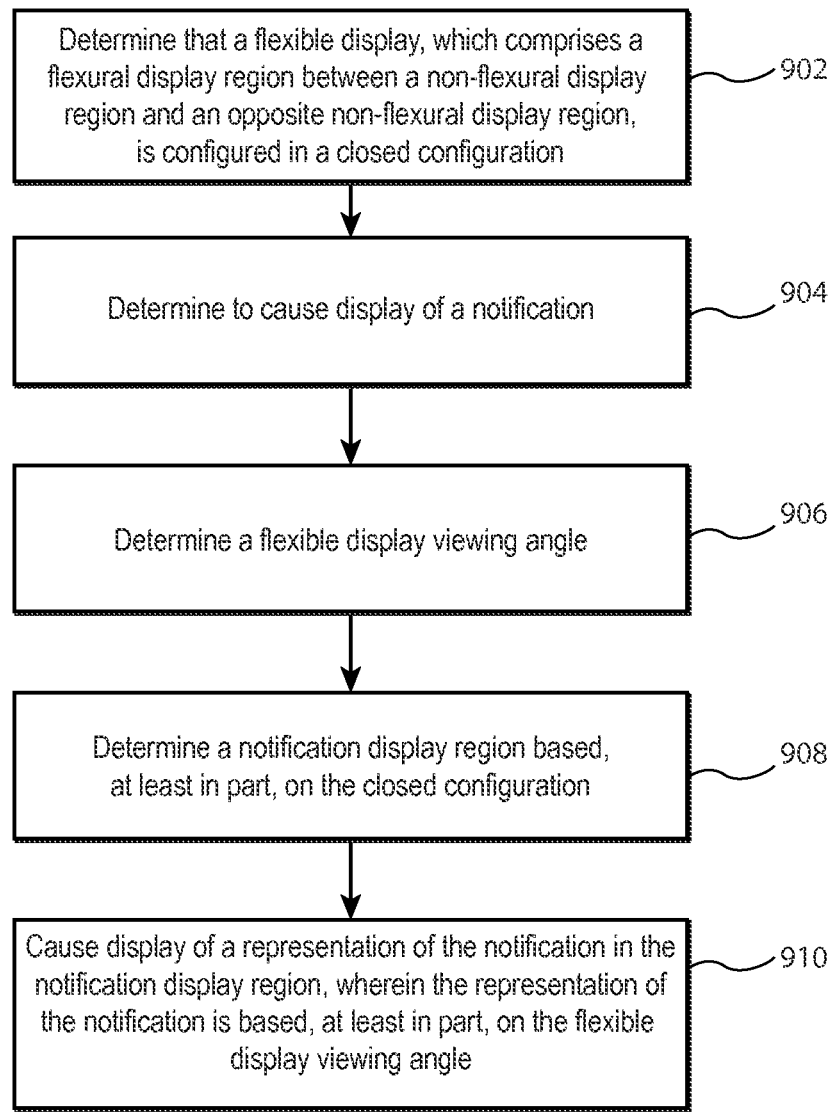
FIG. 9 is a flow diagram illustrating activities associated with causing display of a notification according to at least one example embodiment.

FIG. 9 is a flow diagram illustrating activities associated with causing display of a notification according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus determines that a flexible display, which comprises a flexural display region between a non-flexural display region and an opposite non-flexural display region, is configured in a closed configuration, similar as described regarding block 702 of FIG. 7.

At block 904, the apparatus determines to cause display of a notification, similar as described regarding block 704 of FIG. 7.

At block 906, the apparatus determines a flexible display viewing angle, similar as described regarding FIGS. 4A-4B.

At block 908, the apparatus determines a notification display region based, at least in part, on the closed configuration, similar as described regarding block 706 of FIG. 7.

At block 910, the apparatus causes display of a representation of the notification in the notification display region, wherein the representation of the notification is based, at least in part, on the flexible display viewing angle, similar as described regarding FIGS. 4A-4B and FIGS. 6A-6F.

Figures 10, 11:
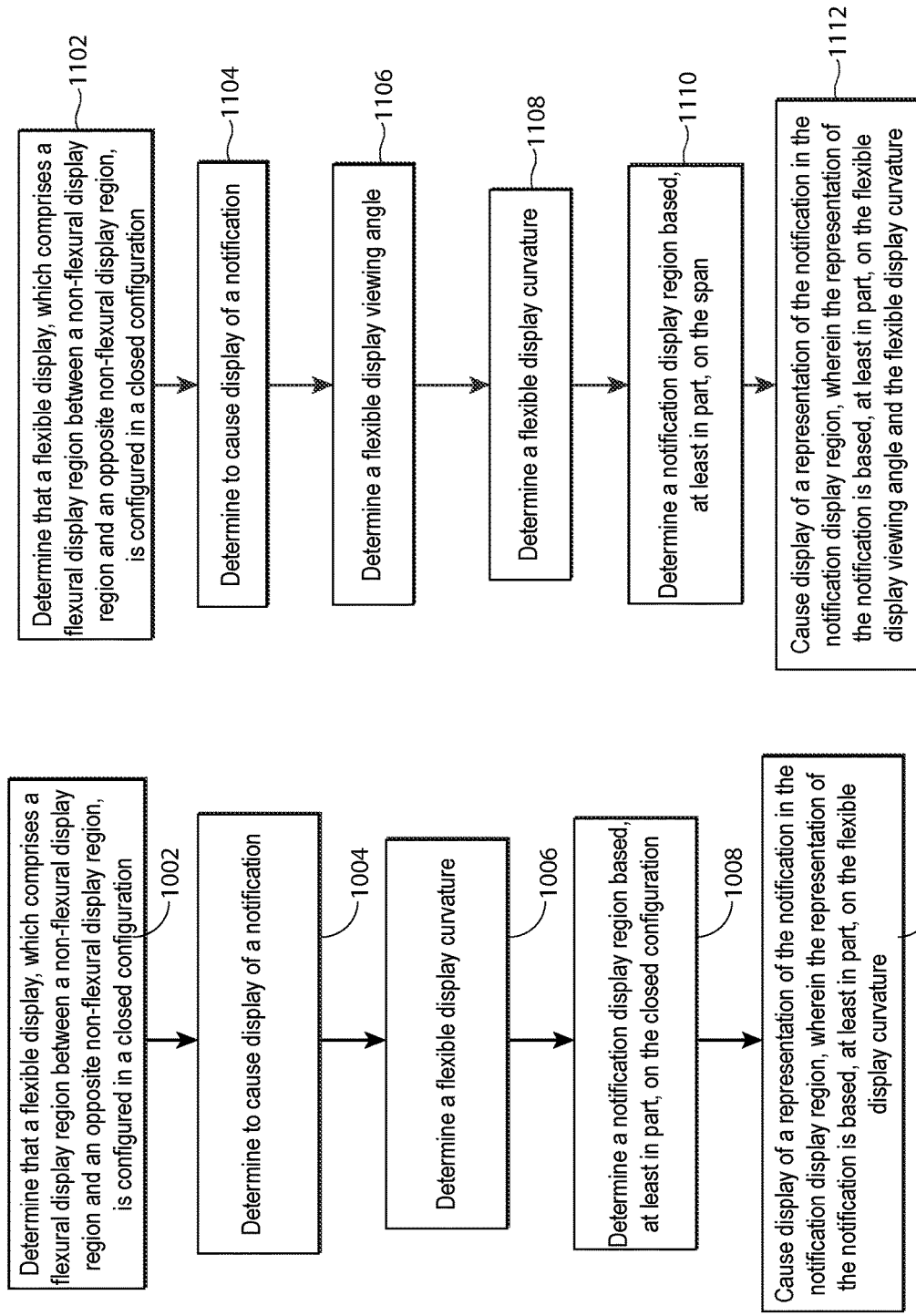
FIG. 10 is a flow diagram illustrating activities associated with causing display of a notification according to at least one example embodiment.
FIG. 11 is a flow diagram illustrating activities associated with causing display of a notification according to at least one example embodiment.

FIG. 10 is a flow diagram illustrating activities associated with causing display of a notification according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus determines that a flexible display, which comprises a flexural display region between a non-flexural display region and an opposite non-flexural display region, is configured in a closed configuration, similar as described regarding block 702 of FIG. 7.

At block 1004, the apparatus determines to cause display of a notification, similar as described regarding block 704 of FIG. 7.

At block 1006, the apparatus determines a flexible display curvature, similar as described regarding FIGS. 3A-3C.

At block 1008, the apparatus determines a notification display region based, at least in part, on the closed configuration, similar as described regarding block 706 of FIG. 7.

At block 1010, the apparatus causes display of a representation of the notification in the notification display region, wherein the representation of the notification is based, at least in part, on the flexible display curvature, similar as described regarding FIGS. 3A-3C and FIGS. 6A-6F.

FIG. 11 is a flow diagram illustrating activities associated with causing display of a notification according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus determines that a flexible display, which comprises a flexural display region between a non-flexural display region and an opposite non-flexural display region, is configured in a closed configuration, similar as described regarding block 702 of FIG. 7.

At block 1104, the apparatus determines to cause display of a notification, similar as described regarding block 704 of FIG. 7.

At block 1106, the apparatus determines a flexible display viewing angle, similar as described regarding block 906 of FIG. 9.

At block 1108, the apparatus determines a flexible display curvature, similar as described regarding block 1006 of FIG. 10.

At block 1110, the apparatus determines a notification display region based, at least in part, on the closed configuration, similar as described regarding block 706 of FIG. 7.

At block 1112, the apparatus causes display of a representation of the notification in the notification display region, wherein the representation of the notification is based, at least in part, on the flexible display viewing angle and the flexible display curvature, similar as described regarding FIGS. 3A-3C, FIGS. 4A-4B, and FIGS. 6A-6F.

FIGS. 12A-12D are illustrations showing flexible display configuration according to at least one example embodiment. The examples of FIGS. 12A-12D are merely examples and do not limit the scope of the claims. For example, flexible display design, proportions, and/or dimensions may vary, flexible display configuration and/or orientation may vary, flexible display flexure and/or curvature may vary, and/or the like.

In certain circumstances, it may be desirable for a user of a flexible display to reveal at least a portion of the flexible display without configuring the flexible display in an open configuration. For example, the user may desire the ability to peek at the flexible display while retaining a substantially closed configuration. For example, in social settings or academic settings, it may be desirable to reveal a portion of a flexible display and merely glance at the flexible display to check for notifications, messages, and/or the like. In at least one example embodiment, a closed configuration of a flexible display relates to a configuration in which all portions of the flexible display are substantially overlapped and obscuring viewing of the flexible display. In one or more example embodiments, a different closed configuration of a flexible display relates to a configuration of the flexible display such that at least on portion of a non-flexural display region is not overlapped by an opposite non-flexural display region. Such a display region may be associated with a non-overlapping region. In one or more example embodiments, a non-flexural display region being non-overlapping with respect to an opposite non-flexural display region relates to existence of a portion of the non-flexural display region having a geometric normal that fails to intersect the opposite non-flexural display region. For example, a portion of the non-flexural display region is overlapped if a geometric normal of that portion intersects the opposite non-flexural display region. Similarly, a portion of the non-flexural display region is not overlapped if a geometric normal of that portion does not intersect the opposite non-flexural display region. In one or more example embodiments, determination that a flexible display is configured in a different closed configuration is based, at least in part, on curvature of the flexural display region, proximity sensor information, light sensor information, and/or the like. Proximity sensor information may relate to magnet sensor information, radar sensor information, and/or the like. Configuration of a flexible display in a different closed position may be associated with the revealing of a non-overlapping region of the flexible display. In certain circumstances, it may be desirable to utilize such a non-overlapping region of a flexible display for display of notifications, messages, and/or the like. In at least one example embodiment, a different notification display region is determined based, at least in part, on a non-overlapping region of a flexible display configured in a different closed configuration. In one or more example embodiments, a representation of a notification is caused to be displayed within a non-overlapping region of a flexible display. In certain circumstances, a flexible display may be configured in a closed configuration and may display a representation of a notification in a viewable display region of a notification display region of the flexible display. In such circumstances, based upon a reconfiguration of a flexible display from a closed configuration and to a different closed configuration, a different representation of the notification may be caused to be displayed in a different notification display region associated with a non-overlapping region of the flexible display.

Figures 12A, 12B:
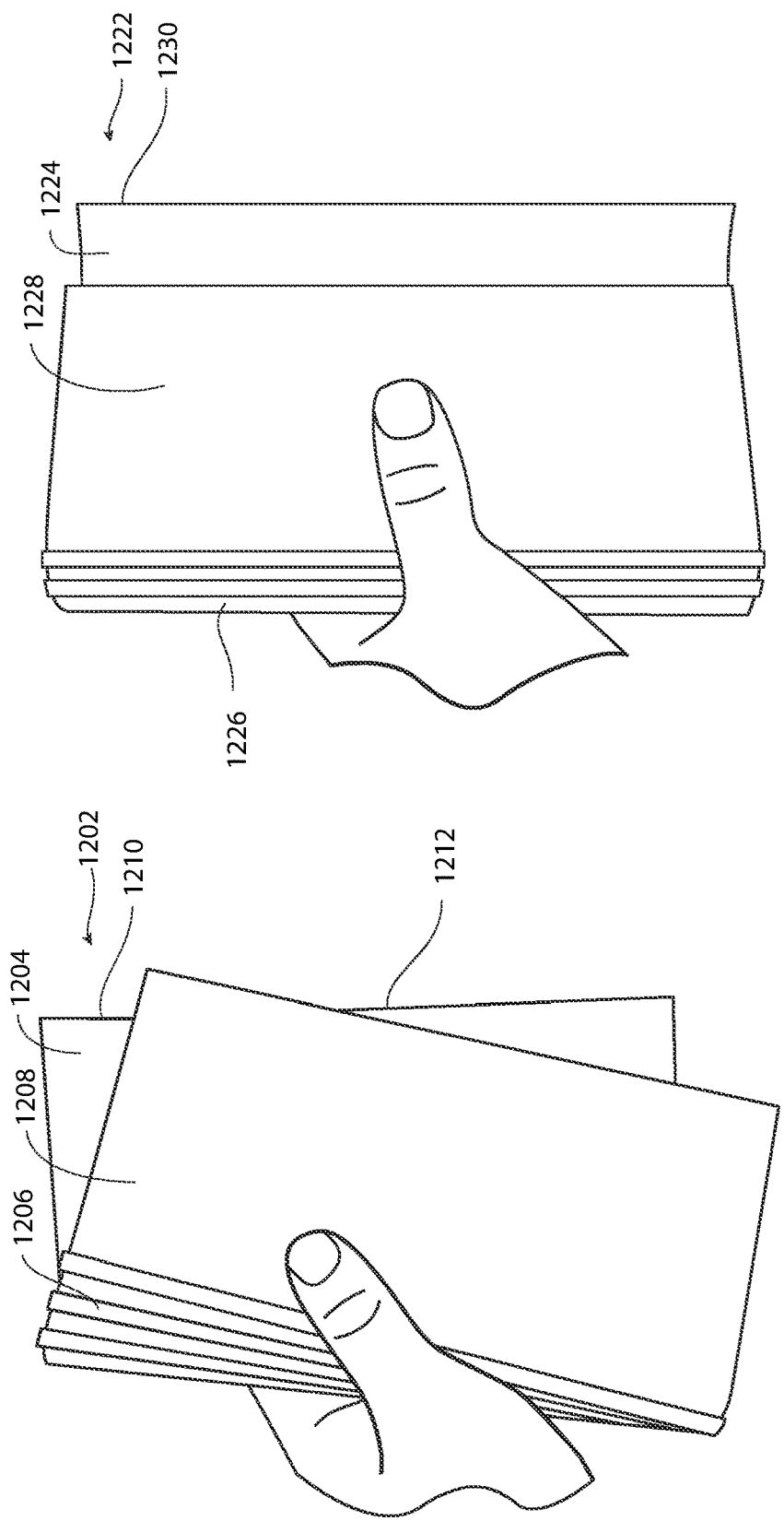
FIGS. 12A-12D are illustrations showing flexible display configuration according to at least one example embodiment.

FIG. 12A is an illustration showing flexible display configuration according to at least one example embodiment. In the example of FIG. 12A, display 1202 relates to a flexible display configured in a different closed configuration. Display 1202 comprises display region 1204, display region 1206, and display region 1208. Display region 1204 relates to a non-flexural display region. Display region 1206 relates to a flexural display region. Display region 1208 relates to an opposite non-flexural display region. In the example of FIG. 12A, display region 1206 is asymmetrically skewed, revealing at least display area 1210 and display area 1212. Display area 1210 and display area 1212 relate to non-overlapping regions of display 1202. In the example of FIG. 12A, there may be additional non-overlapping regions of display 1202 in addition to display area 1210 and display area 1212, which are viewable from a viewer's perspective. Display area 1210 and/or display area 1212 may be associated with one or more notification display regions. The size, shape, and position of display area 1210 and display area 1212 may change based, at least in part, on the skew of display region 1206.

FIG. 12B is an illustration showing flexible display configuration according to at least one example embodiment. In the example of FIG. 12B, display 1222 relates to a flexible display configured in a different closed configuration. Display 1222 comprises display region 1224, display region 1226, and display region 1228. Display region 1224 relates to a non-flexural display region. Display region 1226 relates to a flexural display region. Display region 1228 relates to an opposite non-flexural display region. In the example of FIG. 12B, display region 1226 is symmetrically skewed, revealing at least display area 1230. Display area 1230 relates to a non-overlapping region of display 1222. In the example of FIG. 12B, there may be additional non-overlapping regions of display 1222 in addition to display area 1230, which is viewable from a viewer's perspective. Display area 1230 may be associated with one or more notification display regions. The size, shape, and position of display area 1230 may change based, at least in part, on the skew of display region 1226.

Figure 12C:
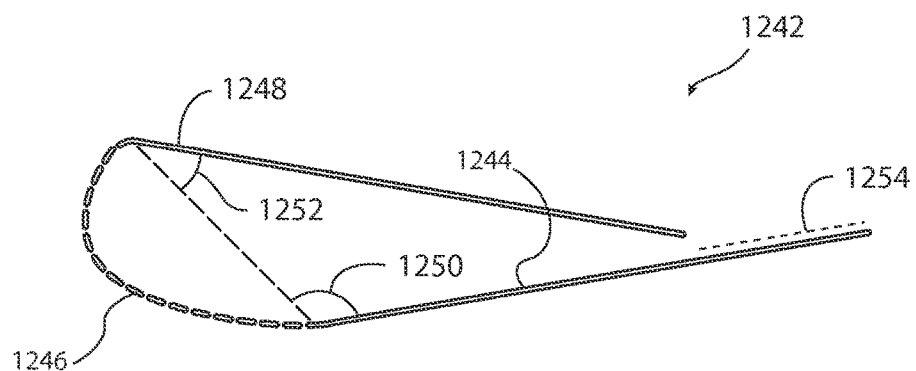

FIG. 12C is an illustration showing flexible display configuration according to at least one example embodiment. In the example of FIG. 12C, display 1242 relates to a flexible display configured in a different closed configuration. Display 1242 comprises display region 1244, display region 1246, and display region 1248. Display region 1244 relates to a non-flexural display region. Display region 1246 relates to a flexural display region. Display region 1248 relates to an opposite non-flexural display region. In the example of FIG. 12C, display region 1246 is skewed, revealing at least display area 1254. In the example of FIG. 12C, the skew of display region 1246 is associated with angle 1250 and angle 1252. The ratio between angle 1250 and angle 1252 may be associated with a determination of display area 1254, a determination of asymmetrical skew, a determination of symmetrical skew, and/or the like. Display area 1254 relates to a non-overlapping region of display 1242. In the example of FIG. 12C, there may be additional non-overlapping regions of display 1242 in addition to display area 1254, which is viewable from a viewer's perspective. Display area 1254 may be associated with one or more notification display regions. The size, shape, and position of display area 1254 may change based, at least in part, on the skew of display region 1246.

Figure 12D:
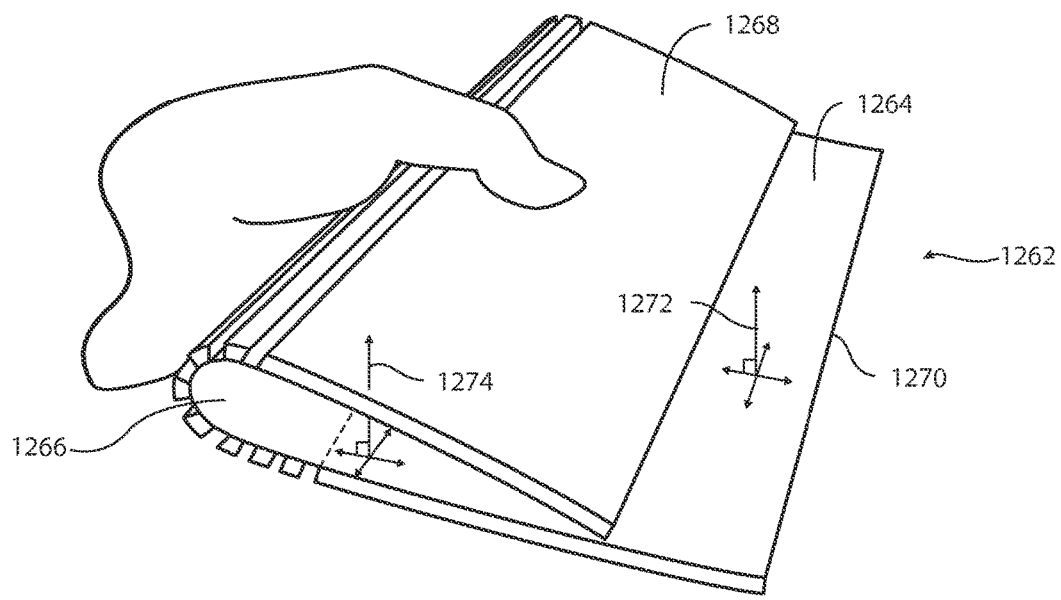

FIG. 12D is an illustration showing flexible display configuration according to at least one example embodiment. In the example of FIG. 12D, display 1262 relates to a flexible display configured in a different closed configuration. Display 1262 comprises display region 1264, display region 1266, and display region 1268. Display region 1264 relates to a non-flexural display region. Display region 1266 relates to a flexural display region. Display region 1268 relates to an opposite non-flexural display region. In the example of FIG. 12D, display region 1266 is symmetrically skewed, revealing at least display area 1270. Display area 1270 relates to a non-overlapping region of display 1262. In the example of FIG. 12D, display area 1270 is associated with a geometric normal 1272 that is non-intersecting with respect to a portion of display 1262. For example, geometric normal 1272 does not intersect display region 1268 and is thus associated with a non-overlapping region of display 1262. Alternatively, overlapping portions of display 1262 may be associated with geometric normal 1274 that is intersections with represent to a portion of display 1262. For example, geometric normal 1274 intersects display region 1268 and is thus associated with an overlapping region of display 1262.

FIG. 13 is a flow diagram illustrating activities associated with causing display of a notification according to at least one example embodiment. In at least one example embodiment, there is a set of operations that corresponds with the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus determines that a flexible display, which comprises a flexural display region between a non-flexural display region and an opposite non-flexural display region, is configured in a closed configuration, such that the non-flexural display region comprises at least one non-overlapped display region, which correlates to at least part of the non-flexural display region that is non-overlapping with respect to the opposite non-flexural display region, similar as described regarding FIGS. 3A-3C and FIGS. 12A-12D.

At block 1304, the apparatus determines to cause display of a notification, similar as described regarding block 704 of FIG. 7.

At block 1306, the apparatus determines a notification display region based, at least in part, on the non-overlapping region, similar as described regarding FIGS. 12A-12D.

At block 1308, the apparatus causes display of a representation of the notification in the notification display region, similar as described regarding FIGS. 5A-5D and FIGS. 12A-12D.

FIG. 14 is a flow diagram illustrating activities associated with causing display of a notification according to at least one example embodiment. In at least one example embodiment, there is a set of operations that corresponds with the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus determines that a flexible display, which comprises a flexural display region between a non-flexural display region and an opposite non-flexural display region, is configured in a closed configuration, similar as described regarding block 702 of FIG. 7.

At block 1404, the apparatus determines to cause display of a notification, similar as described regarding block 704 of FIG. 7.

At block 1406, the apparatus determines a notification display region based, at least in part, on the closed configuration, similar as described regarding block 706 of FIG. 7.

At block 1408, the apparatus causes display of a representation of the notification in the notification display region, similar as described regarding block 708 of FIG. 7.

At block 1410, the apparatus determines that the flexible display is configured in a different closed configuration, such that the non-flexural display region comprises at least one non-overlapped display region, which correlates to at least part of the non-flexural display region that is non-overlapping with respect to the opposite non-flexural display region, similar as described regarding FIGS. 12A-12D.

At block 1412, the apparatus determines to cause display of another notification, similar as described regarding FIGS. 5A-5D.

At block 1414, the apparatus determines a different notification display region based, at least in part, on the non-overlapping region, similar as described regarding FIGS. 12A-12D.

At block 1416, the apparatus causes display of a different representation of the other notification in the different notification display region, similar as described regarding FIGS. 5A-5D and FIGS. 12A-12D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 904 of FIG. 9 may be performed after block 906 of FIG. 9. Furthermore, if desired, one or more of the above-described functions may be optional or may be combined. For example, block 1106 of FIG. 11 may be optional and/or combined with block 1108 of FIG. 11.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
    at least one processor; and
    at least one memory including computer program code, the memory and the computer program code configured to, with the processor, cause the apparatus to perform at least the following:
        determine that a flexible display, which comprises a flexural display region between a non-flexural display region and another non-flexural display region, is configured in a closed configuration in which a side of the non-flexural display region faces the another non-flexural display region;
        determine to cause display of a notification;
        determine a notification display region as a non-overlapped display region on the side of the non-flexural display facing the another non-flexural display region, wherein the non-overlapped display region is not overlapped by the another non-flexural display region, and wherein the non-overlapped display region and the notification display region change dependent upon a viewing angle of the flexible display by a user; and
        cause display of a representation of the notification in the notification display region.

2. The apparatus of claim 1, wherein the closed configuration relates to a configuration such that the flexural display region is flexed and a span exists between at least part of the non-flexural display region and at least part of the another non-flexural display region.

3. The apparatus of claim 1, wherein the representation of the notification is based, at least in part, on a flexible display viewing angle.

4. The apparatus of claim 1, wherein the representation of the notification is based, at least in part, on a flexible display curvature.

5. The apparatus of claim 1, wherein the notification display region is based, at least in part, on a flexible display viewing angle.

6. The apparatus of claim 1, wherein the notification display region is based, at least in part, on a flexible display curvature.

7. The apparatus of claim 1, wherein the memory includes computer program code configured to, with the processor, cause the apparatus to:
    determine that the flexible display is configured in a different closed configuration, such that the non-flexural display region comprises at least one non-overlapped display region, which correlates to at least part of the non-flexural display region that is non-overlapping with respect to the another non-flexural display region;
    determine to cause display of another notification;
    determine a different notification display region based, at least in part, on the non-overlapping region; and
    cause display of a different representation of the other notification in the different notification display region.

8. The apparatus of claim 1, wherein the apparatus comprises the flexible display.

9. The apparatus of claim 1, wherein the non-flexural display region comprises at least one non-overlapped display region, which correlates to at least part of the non-flexural display region that is non-overlapping with respect to the another non-flexural display region; and
    wherein the notification display region is determined based, at least in part, on the non-overlapping region.

10. A method comprising:
    determining that a flexible display, which comprises a flexural display region between a non-flexural display region and another non-flexural display region, is configured in a closed configuration in which a side of the non-flexural display region faces the another non-flexural display region;
    determining to cause display of a notification;
    determining a notification display region as a non-overlapped display region on the side of the non-flexural display facing the another non-flexural display region, wherein the non-overlapped display region is not overlapped by the another non-flexural display region, and wherein the non-overlapped display region and the notification display region change dependent upon a viewing angle of the flexible display by a user; and
    causing display of a representation of the notification in the notification display region.

11. The method of claim 10, wherein the closed configuration relates to a configuration such that the flexural display region is flexed and a span exists between at least part of the non-flexural display region and at least part of the another non-flexural display region.

12. The method of claim 10, wherein the representation of the notification is based, at least in part, on a flexible display viewing angle.

13. The method of claim 10, wherein the representation of the notification is based, at least in part, on a flexible display curvature.

14. The method of claim 10, wherein the notification display region is based, at least in part, on a flexible display viewing angle.

15. The method of claim 10, wherein the notification display region is based, at least in part, on a flexible display curvature.

16. The method of claim 10, further comprising:
    determining that the flexible display is configured in a different closed configuration, such that the non-flexural display region comprises at least one non-overlapped display region, which correlates to at least part of the non-flexural display region that is non-overlapping with respect to the another non-flexural display region;
    determining to cause display of another notification;
    determining a different notification display region based, at least in part, on the non-overlapping region; and
    causing display of a different representation of the other notification in the different notification display region.

17. A method of claim 10, wherein the non-flexural display region comprises at least one non-overlapped display region, which correlates to at least part of the non-flexural display region that is non-overlapping with respect to the another non-flexural display region; and
    wherein the determining a notification display region based, at least in part, on the non-overlapping region.

18. At least one non-transitory computer-readable medium encoded with instructions that, when executed by a processor, perform:
    determining that a flexible display, which comprises a flexural display region between a non-flexural display region and another non-flexural display region, is configured in a closed configuration in which a side of the non-flexural display region faces the another non-flexural display region;
    determining to cause display of a notification;
    determining a notification display region as a non-overlapped display region on the side of the non-flexural display facing the another non-flexural display region, wherein the non-overlapped display region is not overlapped by the another non-flexural display region, and wherein the non-overlapped display region and the notification display region change dependent upon a viewing angle of the flexible display by a user; and
    causing display of a representation of the notification in the notification display region.

19. The medium of claim 18, wherein the closed configuration relates to a configuration such that the flexural display region is flexed and a span exists between at least part of the non-flexural display region and at least part of the another non-flexural display region.

20. The medium of claim 18, wherein the instructions that, when executed by a processor, further perform:
    determining that the flexible display is configured in a different closed configuration, such that the non-flexural display region comprises at least one non-overlapped display region, which correlates to at least part of the non-flexural display region that is non-overlapping with respect to the another non-flexural display region;
    determining to cause display of another notification;
    determining a different notification display region based, at least in part, on the non-overlapping region; and
    causing display of a different representation of the other notification in the different notification display region.

* * * * *